(12) United States Patent
Nojiri et al.

(10) Patent No.: US 10,114,160 B2
(45) Date of Patent: Oct. 30, 2018

(54) POLARIZING PLATE, LIQUID CRYSTAL DISPLAY DEVICE INCLUDING SAME, AND METHOD FOR PRODUCING POLARIZING PLATE

(71) Applicant: FUJIFILM Corporation, Tokyo (JP)

(72) Inventors: Mayumi Nojiri, Kanagawa (JP); Yu Naito, Kanagawa (JP); Nobutaka Fukagawa, Kanagawa (JP); Naoya Shimoju, Kanagawa (JP); Hiroyuki Ishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 224 days.

(21) Appl. No.: 15/226,462

(22) Filed: Aug. 2, 2016

(65) Prior Publication Data

US 2016/0341860 A1    Nov. 24, 2016

Related U.S. Application Data

(63) Continuation of application No. PCT/JP2015/051084, filed on Jan. 16, 2015.

(30) Foreign Application Priority Data

Mar. 5, 2014  (JP) ................................ 2014-043361
Aug. 25, 2014 (JP) ................................ 2014-171022

(51) Int. Cl.
*G02B 5/30* (2006.01)
*G02F 1/1335* (2006.01)

(52) U.S. Cl.
CPC ..... *G02B 5/3033* (2013.01); *G02F 1/133528* (2013.01)

(58) Field of Classification Search
CPC ...... G02B 1/08; G02B 5/3033; G02B 5/3041; G02B 5/305; G02F 1/133528
USPC .......................... 359/487.01, 487.02; 349/96
See application file for complete search history.

(56) References Cited

U.S. PATENT DOCUMENTS

| | | | | |
|---|---|---|---|---|
| 5,130,057 A | * | 7/1992 | Saxe ........................ | G02B 1/04 252/584 |
| 7,289,266 B1 | * | 10/2007 | Kamijo ................ | G02B 5/3033 359/487.02 |
| 8,859,060 B2 | | 10/2014 | Fukagawa et al. | |
| 9,040,129 B2 | * | 5/2015 | Fukagawa .................. | C08J 5/18 428/1.3 |
| 2004/0066482 A1 | * | 4/2004 | Tanaka ................. | G02B 5/3083 349/141 |
| 2005/0243245 A1 | * | 11/2005 | Taguchi ................. | G02B 5/305 349/96 |

(Continued)

FOREIGN PATENT DOCUMENTS

| CN | 102749668 A | 10/2012 |
|---|---|---|
| JP | 03-45905 A | 2/1991 |

(Continued)

OTHER PUBLICATIONS

International Search Report issued in PCT/JP2015/051084 dated Mar. 31, 2015.

(Continued)

*Primary Examiner* — Frank Font
(74) *Attorney, Agent, or Firm* — Edwards Neils LLC; Jean C. Edwards, Esq.

(57) ABSTRACT

A polarizing plate has at least a polarizer layer including a polyvinyl alcohol film dyed with iodine and includes a compound exhibiting a polyiodide ion $I_5^-$ forming ability in an iodide compound-containing solution.

21 Claims, 1 Drawing Sheet

(56) References Cited

U.S. PATENT DOCUMENTS

| | | | | |
|---|---|---|---|---|
| 2006/0227423 A1* | 10/2006 | Saiki | ................... | G02B 5/3033 |
| | | | | 359/487.02 |
| 2007/0146882 A1* | 6/2007 | Yoshioka | ............. | G02B 5/3008 |
| | | | | 359/487.02 |
| 2007/0159580 A1* | 7/2007 | Yoshioka | ............. | G02B 5/3008 |
| | | | | 349/117 |
| 2007/0206282 A1* | 9/2007 | Miyatake | ........... | C09K 19/3852 |
| | | | | 359/487.02 |
| 2011/0134374 A1 | 6/2011 | Fukagawa et al. | | |
| 2011/0273646 A1* | 11/2011 | Fukagawa | ................. | C08J 5/18 |
| | | | | 349/96 |
| 2013/0189449 A1* | 7/2013 | Fukagawa | .............. | C09K 19/52 |
| | | | | 428/1.33 |
| 2014/0057060 A1 | 2/2014 | Fukagawa et al. | | |
| 2015/0055062 A1 | 2/2015 | Hisakado et al. | | |

FOREIGN PATENT DOCUMENTS

| | | |
|---|---|---|
| JP | 2006-139166 A | 6/2006 |
| JP | 2011-118135 A | 6/2011 |
| JP | 2011-237580 A | 11/2011 |
| JP | 2012-108202 A | 6/2012 |
| JP | 2013-174851 A | 9/2013 |
| JP | 2013-254190 A | 12/2013 |
| WO | 2013/168656 A1 | 11/2013 |

OTHER PUBLICATIONS

Written Opinion issued in PCT/JP2015/051084 dated Mar. 31, 2015, (Not in English).

International Preliminary Report on Patentability issued by WIPO dated Sep. 15, 2016, in connection with International Patent Application No. PCT/JP2015/051084.

Office Action, issued by the State Intellectual Property Office of China dated Jan. 12, 2018, in connection with Chinese Patent Application No. 201580010797.6.

Notification of Reasons for Refusal Issued by the Japanese Patent Office dated Apr. 4, 2017, in connection with the Japanese Patent Application No. 2014-171022.

* cited by examiner

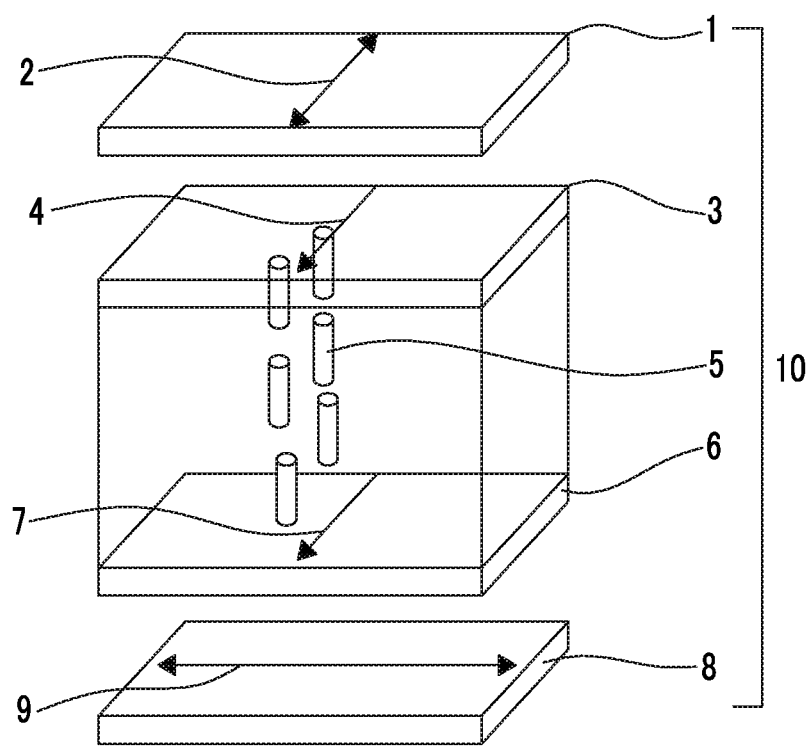

POLARIZING PLATE, LIQUID CRYSTAL DISPLAY DEVICE INCLUDING SAME, AND METHOD FOR PRODUCING POLARIZING PLATE

CROSS-REFERENCE TO RELATED APPLICATIONS

This application is a Continuation of PCT International Application No. PCT/JP2015/51084, filed on Jan. 16, 2015, which was published under PCT Article 21(2) in Japanese, and which claims priority under 35 U.S.C. § 119(a) to Japanese Patent Application No. 2014-043361, filed on Mar. 5, 2014 and Japanese Patent Application No. 2014-171022, filed on Aug. 25, 2014. The above applications are hereby expressly incorporated by reference, in their entirety, into the present application.

BACKGROUND OF THE INVENTION

1. Field of the Invention

The present invention relates to a polarizing plate, a liquid crystal display device including the polarizing plate, and a method for producing the polarizing plate.

2. Description of the Related Art

Liquid crystal display devices have become common as compact image display devices that consume little energy, and their applications are spreading each year.

The general configuration of a liquid crystal display device is such that polarizing plates are provided on both sides of a liquid crystal cell. The polarizing plates perform a role of only allowing passing of light having a polarization plane in a specific direction, and the performance of the polarizing plates greatly affects the performance of the liquid crystal display device. The polarizing plates are generally configured to include at least a polarizer (hereinafter, also referred to as a polarizer layer) which is composed of a polyvinyl alcohol film on which iodine is adsorbed and aligned, and optionally include other layers such as protective films (for example, refer to JP2012-108202A).

SUMMARY OF THE INVENTION

In recent years, opportunities for using liquid crystal display devices not just indoors, but also outdoors (for example, large-screen displays which are mounted outdoors, portable devices and the like) have increased. Therefore, it has become necessary for the polarizing plates that constitute a liquid crystal display device to have a high durability enabling the polarizing plates to withstand use in various environments including outdoor use. Regarding this point, in JP2012-108202A, a polarizer layer including a water-soluble antioxidant such as ascorbic acid to enhance the durability of the polarizer layer at a high temperature is proposed.

However, in the examples in JP2012-108202A, the durability of the polarizer layer is evaluated based on the degree of color change after the polarizer layer is left to stand in a dry atmosphere at 80° C. for a predetermined period of time. As factors deteriorating the polarizer, in addition to temperature, humidity can be mentioned. Therefore, as long as the durability of the polarizer can be enhanced in a high temperature and high humidity environment, it is possible to provide a polarizer that is more durable in use in various environments.

An object of the present invention is to provide a polarizing plate that can exhibit high durability in a high temperature and high humidity environment.

As a result of intensive investigations to achieve the above-described object, the present inventors have newly found that the following polarizing plate: a polarizing plate, which comprises at least a polarizer layer including a polyvinyl alcohol film dyed with iodine; and a compound exhibiting a polyiodide ion $I_5^-$ forming ability in an iodide compound-containing solution has high durability even after the polarizing plate is left to stand in a high temperature and high humidity environment (specifically, the polarizing plate can exhibit good polarization performance even after the polarizing plate is left to stand in a high temperature and high humidity environment).

Regarding the reason why the durability of the polarizing plate can be enhanced in a high temperature and high humidity environment by using the above compound, the present inventors have assumed as follows. However, the following is an assumption made by the present inventors and does not limit the present invention in any way.

A polyvinyl alcohol film dyed with iodine normally contains, in addition to monoiodide ions $I^-$ and iodine molecules $I_2$ that have been included in an iodine dye solution, polyiodide ions $I_3^-$ formed of monoiodide ions and iodine molecules, and polyiodide ions $I_5^-$, formed of these polyiodide ions $I_3^-$ and iodine molecules.

On the other hand, in JP2012-108202A, it is proposed to use a water-soluble antioxidant such as ascorbic acid to prevent the number of polyiodide ions $I_3^-$ from increasing in a polarizer producing step because it is considered that complexes formed of polyiodide ions $I_3^-$ and a polyvinyl alcohol resin (hereinafter, simply referred to as "polyvinyl alcohol" or "PVA") cause polarizer alignment disorder, resulting in deterioration of the polarizer.

In contrast, the present inventors have concluded that instead of preventing the number of polyiodide ions $I_3^-$ from increasing, the amount of complexes, which are formed of polyiodide ions $I_5^-$ in the form of polyiodide ions $I_3^-$ being further bonded to iodine molecules $I_2$, and PVA should be increased. Herein, the present inventors have newly found that when a compound exhibiting a polyiodide ion $I_5^-$ forming ability in the iodide compound-containing solution is incorporated in the polarizing plate, it is possible to provide a polarizing plate that can exhibit good polarization performance after the polarizing plate is left to stand in a high temperature and high humidity environment. The present inventors have assumed that the compound can increase the amount of complexes formed of $I_5^-$ and PVA by converting $I_3^-$ in the complexes formed of $I_3^-$ and PVA into $I_5^-$.

In the following description, $I_3^-$ and $I_5^-$ are used as an example of polyiodide ions. However, higher-valency polyiodide ions may be included. In addition, higher-valency polyiodide ions may form complexes with PVA similar to $I_3^-$ and $I_5^-$.

The polyiodide ion $I_5^-$ forming ability in the iodide compound-containing solution is measured in the following manner. Unless specifically stated otherwise, the operation described below is carried out in air at room temperature (at 25° C. and a relative humidity of 40% RH).

An example of a method using potassium iodide as the iodide compound will be described below. However, iodide compounds other than potassium iodide, such as lithium iodide, sodium iodide, zinc iodide, aluminum iodide, lead iodide, copper iodide, barium iodide, calcium iodide, tin iodide, and titanium iodide may be also used as the iodide compound. The iodide compound-containing solution contains at least monoiodide ions I⁻ ionized from the iodide compound.

(1) Potassium iodide (KI) is added to a mixed solvent (water:methanol=1:1 (volumetric ratio)) and thoroughly stirred to prepare a 0.05 M concentration potassium iodide solution.

Some of the potassium iodide solution that has been prepared is used to prepare a solution of the target compound below and the remainder is used as a reference solution.

(2) 0.025 mmol of the target compound, the ability of which to form polyiodide ions $I_5^-$ in a potassium iodide solution is being determined, is added to 5 mL of the potassium iodide solution and the mixture is thoroughly stirred and mixed. Herein, the stirring and mixing will sometimes cause the target compound to thoroughly dissolve in the potassium iodide solution and will sometimes cause small quantities (for example, 5% by mass or less of the total amount of the target compound to be added to the solution) to remain as undissolved matter. In the case in which there is a large amount of undissolved matter and it is difficult to correctly read the light absorbance due to the scattering of light and the like caused by the undissolved matter during light absorbance measurement (that is, in the case in which the target compound has low solubility in water or methanol), half of the methanol is replaced with a solvent in which the target compound has high solubility (hereinafter, referred to as a third solvent) and measurement is carried out. Accordingly, in this case, a mixed solvent in the form of water:methanol:third solvent=1:0.5:0.5 (volumetric ratio) is used as the mixed solvent. From the viewpoint of high compatibility with water and low reactivity with iodide ions and iodine molecules, the third solvent in the form of ethanol, dimethylformamide (DMF), acetonitrile, acetone, or the like is preferably used, but there is no limitation thereto. A mixture of two or more solvents may also be used as the third solvent.

The pressure-resistant test tube containing the target compound solution thus prepared and the pressure-resistant test tube containing the reference solution are left to stand for 2 hours to 8 hours in a state in which the pressure-resistant test tubes are immersed in a hot water bath at a liquid temperature of 60° C.

(3) Subsequently, some of the target compound solution is collected from the pressure-resistant test tube that has been removed from the hot water bath and a cell having a width of 1 mm (the distance traversed by the light passing through) is used to measure the light absorbance of the target compound solution at a wavelength of 355 nm with a spectrophotometer.

(4) Some of the reference solution, as well, is collected from the pressure-resistant test tube that has been left to stand in a state in which the pressure-resistant test tube has been immersed in a hot water bath for the same period of time as the pressure-resistant test tube containing the target compound solution, and the light absorbance thereof is measured in the same manner as for the target compound solution.

(5) A compound, the measured light absorbance of which in the target compound solution exceeds 0.0 is determined as a compound exhibiting a polyiodide ion $I_5^-$ forming ability in the potassium iodide solution, and a compound whose measured light absorbance is 0.0 is determined as a compound not exhibiting a polyiodide ion $I_5^-$ forming ability in the potassium iodide solution.

However, in the case in which the target compound solution has an absorption at a wavelength of 355 nm before being immersed in the hot water bath, the value that is obtained by subtracting the light absorbance of the target compound solution at a wavelength of 355 nm before immersion in the hot water bath from the light absorbance obtained in the above measurement is used to determine whether or not the target compound exhibits a polyiodide ion $I_5^-$ forming ability. In addition, in the case in which the light absorbance of the reference solution at a wavelength of 355 nm exceeds 0.0, the value that is obtained by subtracting the light absorbance obtained for the reference solution from the light absorbance obtained for the target compound solution is used to determine whether or not the target compound exhibits a polyiodide ion $I_5^-$ forming ability in the potassium iodide solution.

The light absorbance measurement with a spectrophotometer is carried out by a comparison between the measurement result for the target solution to be measured and the measurement result for a blank solution. The measurement of the blank solution (referred to hereinafter as a "blank test") is carried out using the same cell as the cell used to measure the light absorbance of the target compound solution in order to eliminate or reduce the effect of the cell. The mixed solvent that is used to prepare the target compound solution (not containing the target compound or potassium iodide) is used as the blank solution.

The wavelength of 355 nm used for obtaining the light absorbance in the measurement is a wavelength at which absorption by polyiodide ions $I_5^-$ is exhibited. Accordingly, a light absorbance at a wavelength of 355 nm exceeding 0.0, that is, the target compound solution having an absorption at a wavelength of 355 nm indicates that polyiodide ions $I_5^-$ are present in the solution. This means that the target compound forms polyiodide ions $I_5^-$ in the potassium iodide solution including monoiodide ions I⁻. The present inventors have considered that the fact that $I_5^-$ can be formed in the potassium iodide solution including monoiodide ions I⁻ means that the compound has an action of promoting oxidation of I⁻ ($I_2$ formation by this oxidation), and promoting $I_3^-$ formation from $I_2$ and I⁻, and further, $I_5^-$ formation from formed $I_3^-$ and $I_2$. The present inventors assume that the fact that the amount of complexes formed of $I_5^-$ and PVA can be increased by the compound exhibiting an action of promoting formation of $I_5^-$ as described above contributes to maintaining or improving the polarization performance of the polarizer layer.

In one embodiment, in the above polarizing plate, the compound is included in the polarizer layer.

In one embodiment, in the above polarizing plate, the compound is present at least on a surface, or in a surface layer region including the surface, of the polarizer layer.

In one embodiment, the compound includes specific carbon atoms and the specific carbon atoms are bonded to an electron-withdrawing group through a single bond and not bonded to other carbon atoms through a double bond.

In one embodiment, the compound includes specific carbon atoms and the specific carbon atoms are respectively bonded to two electron-withdrawing groups through a single bond and not bonded to other carbon atoms through a double bond.

In one embodiment, the electron-withdrawing group is a carbonyl group.

In one embodiment, the compound includes one or more hetero atoms.

In one embodiment, the compound includes a cyclic structure including the specific carbon atoms.

In one embodiment, the cyclic structure is a heterocyclic ring.

In one embodiment, the cyclic structure is a 5-membered or 6-membered ring.

In one embodiment, the cyclic structure is a nitrogen-containing heterocyclic ring.

Another embodiment of the present invention is a method for producing the polarizing plate comprising: a step of forming at least one layer including a compound exhibiting a polyiodide ion $I_5^-$ forming ability in the iodide compound-containing solution.

In one embodiment, the production method further comprises at least a dyeing step of dyeing a polyvinyl alcohol film with iodine, and a step of forming a polarizer layer including the compound exhibiting a polyiodide ion $I_5^-$ forming ability in the iodide compound-containing solution by applying the compound to the polyvinyl alcohol film at least before the dyeing step, during the dyeing step, or after the dyeing step.

In one embodiment, the application of the compound is carried out by coating at least one surface of the polyvinyl alcohol film dyed with iodine with a solution including the compound exhibiting a polyiodide ion $I_5^-$ forming ability in the iodide compound-containing solution.

Still another embodiment of the present invention relates to a liquid crystal display device comprising the polarizing plate.

According to one embodiment of the present invention, it is possible to provide a polarizing plate that can exhibit good polarization performance even after the polarizing plate is left to stand in a high temperature and high humidity environment and a liquid crystal display device including the polarizing plate.

BRIEF DESCRIPTION OF THE DRAWINGS

FIG. 1 is a schematic view showing an example of a liquid crystal display device according to one embodiment of the present invention.

DESCRIPTION OF THE PREFERRED EMBODIMENTS

The description given below may be based on representative embodiments of the present invention. However, the present invention is not limited to such embodiments. In the present invention and in the present specification, a range stated using the word "to" includes the preceding and succeeding numeric values as minimum and maximum values, respectively.

In addition, in the present invention and in the present specification, when a group (atomic group) is denoted without specifying whether substituted or unsubstituted, the group includes not only a group having no substituent but also a group having a substituent. For example, the term "an alkyl group" includes not only an alkyl group having no substituent (an unsubstituted alkyl group) but also an alkyl group having a substituent (a substituted alkyl group).

[Polarizing Plate]

A polarizing plate according to one embodiment of the present invention has at least a polarizer layer composed of a polyvinyl alcohol film dyed with iodine and includes a compound exhibiting a polyiodide ion $I_5^-$ forming ability in an iodide compound-containing solution (hereinafter, simply referred to as a "compound exhibiting a polyiodide ion $I_5$– forming ability").

Hereinafter, the polarizing plate will be described in more detail.

<Configuration of Polarizing Plate>

The polarizing plate has at least a polarizer layer composed of a polyvinyl alcohol film dyed with iodine. The polarizing plate can further has other optional layers such as one or more polarizing plate protective films, adhesive layers, and the like. The optionally provided layers will be described later.

The polarizer layer included in the polarizing plate is composed of a polyvinyl alcohol film dyed with iodine. Herein, the "dyeing with iodine" is normally carried out by bringing an aqueous solution containing iodine $I_2$ and an iodide compound (such as potassium iodide KI including monoiodide ions $I^-$ and a compound including polyiodide ions such as $I_3^-$ or $I_5^-$) into contact with a polyvinyl alcohol film (such as by immersing a polyvinyl alcohol film in the above-described aqueous solution). The details will be described later. The step of fabricating the polarizer layer normally includes iodine dyeing, a crosslinking step, and a stretching step. The details thereof will be described later in detail. After each of the steps may be carried out on a polyvinyl alcohol film that has been formed on a resin substrate, the polyvinyl alcohol film may be peeled off the resin substrate to fabricate a polyvinyl alcohol film that has been dyed with iodine. A polyvinyl alcohol film can be formed on a resin substrate by coating the surface of a resin substrate with a composition including a polyvinyl alcohol resin.

The thickness of the polarizer layer thus obtained is within a range of, for example, 0.1 µm to 100 µm, and from the viewpoint of polarization performance, is preferably within a range of 1 µm to 25 µm.

<Compound Exhibiting Polyiodide Ion $I_5^-$ Forming Ability>

In one embodiment of the polarizing plate, the compound exhibiting a polyiodide ion $I_5^-$ forming ability can be included in the polarizer layer. In addition, in another embodiment, the compound exhibiting a polyiodide ion $I_5^-$ forming ability can be included in one or more layers provided other than the polarizer layer. In still another embodiment, the compound exhibiting a polyiodide ion $I_5^-$ forming ability be included in the polarizer layer and one or more layers provided other than the polarizer layer. The compound exhibiting a polyiodide ion $I_5^-$ forming ability may be in the form of any one of a hydrate, solvate, and salt.

Hereinafter, the compound exhibiting a polyiodide ion $I_5^-$ forming ability will be described in more detail.

The present inventors have considered that as one assumable mechanism, there is a possibility that the compound exhibiting a polyiodide ion $I_5^-$ forming ability, which is evaluated by the above-described method, is oxidized by oxygen and changed to an oxidation activating compound, thereby contributing to exhibiting a polyiodide ion $I_5^-$ forming ability. Specifically, the present inventors have considered that the oxidation activating compound having an action of promoting a reaction of forming $I_2$ by oxidization of monoiodide ions contributes to exhibiting a polyiodide ion $I_5^-$ forming ability. The light absorbance of the compound exhibiting a polyiodide ion $I_5^-$ forming ability, which is obtained by the above-described method, exceeds 0.0, preferably 0.1 or more, more preferably 0.5 or more, and even more preferably 1.0 or more. On the other hand, the light absorbance can be, for example, less than 5.0, 3.0 or less, or 2.5 or less. However, since it is considered that the higher light absorbance can increase the number of polyiodide ions $I_5^-$ in the polyvinyl alcohol film, the upper limit is not particularly limited. The light absorbance may be 5.0 or more. In addition, in the above-described method, the time for leaving the pressure-resistant test tubes to stand in the hot water bath is set to 2 hours to 8 hours. However, a compound exhibiting a light absorbance exceeding 0.0 in a shorter period of time is more preferable. From this viewpoint, a compound exhibiting a light absorbance exceeding 0.0 in a standing time of 2 hours is particularly preferable.

As a partial structure that can be considered to contribute to exhibiting the polyiodide ion $I_5^-$ forming ability, a structure in which an electron-withdrawing group and carbon atoms are bonded to each other through a single bond can be used. Accordingly, it is preferable that the compound exhibiting a polyiodide ion $I_5^-$ forming ability includes the above structure as the partial structure. In one preferable embodiment, the carbon atoms are respectively bonded to two electron-withdrawing groups through a single bond. In addition, in another preferable embodiment, carbon atoms bonded to an electron-withdrawing group through a single bond are included in a cyclic structure. In still another preferable embodiment, regarding carbon atoms bonded to an electron-withdrawing group through a single bond, the number of hydrogen atoms bonded to the carbon atoms through a single bond is preferably 1. As the electron-withdrawing group, a group having a σp value of the Hammett's rule of greater than 0 is preferable. The details of the electron-withdrawing group can be referred to the description regarding Formula (I) below. In one embodiment, the electron-withdrawing group is preferably a carbonyl group (—C(=O)—). However, it is preferable that the carbon atoms bonded to the carbonyl group through a single bond are not bonded to other carbon atoms through a double bond. In addition, it is preferable that the carbonyl group is not bonded to another carbonyl group through a single bond. Further, as the electron-withdrawing group, a divalent electron-withdrawing group such as —SO$_2$—, —SO—, or —P(=O)(ORb)O— is also preferable. Herein, Rb represents a substituent. Examples of the substituent include various substituents which will be described later. The compound exhibiting a polyiodide ion $I_5^-$ forming ability is preferably included in one or more above preferable embodiments, more preferably included in two or more above preferable embodiments, and even more preferably included in three or more above preferable embodiments.

It is preferable that the compound exhibiting a polyiodide ion $I_5^-$ forming ability includes specific carbon atoms. The term "specific carbon atoms" refers to either (1) carbon atoms which are bonded to an electron-withdrawing group through a single bond and not bonded to other carbon atoms through a double bond, or (2) carbon atoms which are respectively bonded to two electron-withdrawing groups through a single bond and not bonded to other carbon atoms through a double bond.

Among the compounds included in one or more above embodiment, a compound not exhibiting a polyiodide ion $I_5^-$ forming ability is present. Whether or not the compound exhibits a polyiodide ion $I_5^-$ forming ability is determined by the above-described method.

The compound exhibiting a polyiodide ion $I_5^-$ forming ability may be a cyclic compound or a linear compound, or may have a branched structure. Regarding the cyclic compound, it is preferable that the electron-withdrawing group is included in the cyclic structure.

It is more preferable that the compound having the above-described preferable partial structure includes one or more hetero atoms. The number of hetero atoms included in one molecule is, for example, 1 to 10 and is preferably 1 to 6. Examples of the hetero atom include a nitrogen atom, a sulfur atom, an oxygen atom, and a phosphorus atom. Two or more different types of hetero atoms may be combined and included in one molecule. In the case in which the hetero atoms are included in the cyclic structure, the hetero atoms are preferably nitrogen atoms, sulfur atoms, and oxygen atoms and more preferably nitrogen atoms. That is, the compound exhibiting a polyiodide ion $I_5^-$ forming ability preferably has a heterocyclic ring and more preferably has a nitrogen-containing heterocyclic ring as the cyclic structure. The heterocyclic ring is preferably a 5-membered or 6-membered ring. The hetero atom included in the heterocyclic ring is preferably at least one of a nitrogen atom or an oxygen atom more preferably at least one nitrogen atom, and is most preferably composed of a nitrogen atom. On the other hand, in the case in which oxygen atoms are included in the compound as the hetero atoms, in one embodiment, the oxygen atom is an oxygen atom which is bonded to the carbon atom through a single bond to constitute a carbonyl group (—C(=O)—). That is, as a more preferably partial structure, a structure which has a nitrogen-containing heterocyclic ring and includes the carbonyl group and includes carbon atoms which are bonded to the carbonyl group through a single bond can be used. As an even more preferable partial structure, a structure which has a nitrogen-containing heterocyclic ring and includes carbon atoms which are respectively bonded to two carbonyl groups through a single bond.

According to one assumable mechanism described above, it is though that after the compound exhibiting a polyiodide ion $I_5^-$ forming ability in the polarizing plate is oxidized by oxygen and converted into an oxidation activating compound, monoiodide ions $I^-$ are oxidized and the compound is finally changed into an oxidant. Accordingly, the polarizing plate includes the oxidant of the compound exhibiting a polyiodide ion $I_5^-$ forming ability and is included in the polarizing plate according to one embodiment of the present invention. In addition, according to the one assumable mechanism described above, the compound having a substance easily converted into an oxidation activating compound is also preferable as the compound exhibiting a polyiodide ion $I_5^-$ forming ability. From this viewpoint, as a preferable compound, an unsaturated fat acid such as linoleic acid may be used.

In addition, in one preferable embodiment, a concentration distribution or localization state of the compound can be maintained in a desired region by preventing diffusion or the like by introducing a functional group which interacts with components included in the polarizer layer into the compound exhibiting a polyiodide ion $I_5^-$ forming ability.

Hereinafter, specific embodiments of the compound exhibiting a polyiodide ion $I_5^-$ forming ability will be described. However, the present invention is not limited to the following specific embodiments.

(Compound Represented by Formula (1))

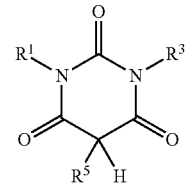

Formula (1)

(In Formula (1), $R^1$ and $R^3$ each independently represent a hydrogen atom, a linear alkyl group having 1 to 20 carbon atoms, a branched alkyl group having 3 to 20 carbon atoms, a cycloalkyl group having 3 to 20 carbon atoms, an alkenyl group having 2 to 20 carbon atoms, or an aromatic group having 6 to 20 carbon atoms, and $R^5$ represents a substituent.)

Preferable ranges of $R^1$ and $R^3$ in Formula (1) will be described.

The linear alkyl group having 1 to 20 carbon atoms or the branched alkyl group having 3 to 20 carbon atoms are preferably a linear alkyl group having 1 to 10 carbon atoms or a branched alkyl group having 3 to 20 carbon atoms, more preferably a linear alkyl group having 1 to 5 carbon atoms or a branched alkyl group having 3 to 5 carbon atoms, even more preferably a linear alkyl group having 1 to 3 carbon atoms, and particularly preferably a methyl group or an ethyl group.

The cycloalkyl group having 3 to 20 carbon atoms is preferably a cycloalkyl group having 3 to 10 carbon atoms and more preferably a cycloalkyl group having 4 to 8 carbon atoms. Specific examples of the cycloalkyl group include cyclopropyl group, cyclopentyl group and cyclohexyl group and a cyclohexyl group is particularly preferable. The cycloalkyl group herein means a cyclic alkyl group.

The alkenyl group having 2 to 20 carbon atoms is preferably an alkenyl group having 2 to 10 carbon atoms and more preferably an alkenyl group having 2 to 5 carbon atoms.

The aromatic group having 6 to 20 carbon atoms may be an aromatic hydrocarbon group or aromatic heterocyclic group. However, the aromatic group is preferably an aromatic hydrocarbon group. The aromatic hydrocarbon group is preferably a phenyl group or naphthyl group, and a phenyl group is more preferable.

Each of $R^1$ and $R^3$ may have a substituent. The substituent is not particularly limited, and examples thereof include an alkyl group (preferably an alkyl group having 1 to 10 carbon atoms, for example, a methyl group, an ethyl group, an isopropyl group, a t-butyl group, a pentyl group, a heptyl group, a 1-ethylpentyl group, a benzyl group, a 2-ethoxyethyl group, or a 1-carboxymethyl group), an alkenyl group (preferably an alkenyl group having 2 to 20 carbon atoms, for example, a vinyl group, an allyl group, or an oleyl group), an alkynyl group (preferably an alkynyl group having 2 to 20 carbon atoms, for example, an ethynyl group, a butadienyl group, or a phenylethynyl group), a cycloalkyl group (preferably a cycloalkyl group having 3 to 20 carbon atoms, for example, a cyclopropyl group, a cyclopentyl group, a cyclohexyl group, or a 4-methylcyclohexyl group), an aryl group (preferably an aryl group having 6 to 26 carbon atoms, for example, a phenyl group, a 1-naphthyl group, a 4-methoxyphenyl group, a 2-chlorophenyl group, or a 3-methylphenyl group), a heterocyclic group (preferably a heterocyclic group having 0 to 20 carbon atoms, in which the ring-constituting hetero atom may be preferably an oxygen atom, a nitrogen atom or a sulfur atom, the ring may be condensed with a 5-membered or 6-membered ring, for example, a benzene ring or a hetero ring, and the ring may be a saturated ring, an unsaturated ring or an aromatic ring, for example, a 2-pyridyl group, a 4-pyridyl group, a 2-imidazolyl group, a 2-benzoimidazolyl group, a 2-thiazolyl group, or a 2-oxazolyl group), an alkoxy group (preferably an alkoxy group having 1 to 20 carbon atoms, for example, a methoxy group, an ethoxy group, an isopropyloxy group, or a benzyloxy group), an aryloxy group (preferably an aryloxy group having 6 to 26 carbon atoms, for example, a phenoxy group, a 1-naphthyloxy group, a 3-methylphenoxy group, or a 4-methoxyphenoxy group), an alkylthio group (preferably an alkylthio group having 1 to 20 carbon atoms, for example, a methylthio group, an ethylthio group, an isopropylthio group, or a benzylthio group), an arylthio group (preferably an arylthio group having 6 to 26 carbon atoms, for example, a phenylthio group, a 1-naphthylthio group, a 3-methylphenylthio group, or a 4-methoxyphenylthio group), an acyl group (including an alkylcarbonyl group, an alkenylcarbonyl group, an arylcarbonyl group and a heterocyclic carbonyl group, preferably an acyl group having 20 carbon atoms or less, for example, an acetyl group, a pivaloyl group, an acryloyl group, a methacryloyl group, and a benzoyl group, or a nicotinoyl group), an aryloylalkyl group, an alkoxycarbonyl group (preferably an alkoxycarbonyl group having 2 to 20 carbon atoms, for example, an ethoxycarbonyl group, or a 2-ethylhexyloxycarbonyl group), an aryloxycarbonyl group (preferably an aryloxycarbonyl group having 7 to 20 carbon atoms, for example, a phenyloxycarbonyl group or a naphthyloxycarbonyl group), an amino group (including an amino group, an alkylamino group, an arylamino group or a heterocyclic amino group, preferably an amino group having 0 to 20 carbon atoms, for example, an amino group, an N,N-dimethylamino group, an N,N-diethylamino group, an N-ethylamino group, an aniline group, a 1-pyrrolidinyl group, a piperidino group, or a morphonyl group), a sulfonamide group (preferably a sulfonamide group having 0 to 20 carbon atoms, for example, an N,N-dimethylsulfonamide group or an N-phenylsulfonamide group), a sulfamoyl group (preferably a sulfamoyl group having 0 to 20 carbon atoms, for example, an N,N-dimethylsulfamoyl group or an N-phenylsulfamoyl group), an acyloxy group (preferably an acyloxy group having 1 to 20 carbon atoms, for example, an acetyloxy group or a benzoyloxy group), a carbamoyl group (preferably a carbamoyl group having 1 to 20 carbon atoms, for example, an N,N-dimethylcarbamoyl group or an N-phenylcarbamoyl group), an acylamino group (preferably an acylamino group having 1 to 20 carbon atoms, for example, an acetylamino group, an acryloylamino group, a benzoylamino group, or a nicotinamide group), a cyano group, a hydroxyl group, a mercapto group, and a halogen atom (for example, a fluorine atom, a chlorine atom, a bromine atom, or an iodine atom). The substituents which may be owned by $R^1$ and $R^3$ may further have the above-described substituents.

Among the above-described substituents which may be owned by $R^1$ and $R^3$, preferable are an alkyl group, an aryl group, an alkoxy group and an acyl group.

$R^5$ represents a substituent. The substituent is not particularly limited and is represented by those shown as the substituents owned by $R^1$ and $R^3$. $R^5$ is preferably an alkyl group (preferably an alkyl group having 1 to 5 carbon atoms), an aryl group or an aralkyl group, more preferably an aryl group or an aralkyl group, and even more preferably a phenyl group or a benzyl group.

In particular in the present invention, $R^5$ is more preferably a "substituent having an aromatic ring and showing a polar effect". These groups may further be substituted by another substituent. The substituent having an aromatic ring represented by $R^5$ preferably has a structure showing a polar effect, so as to contribute to scavenge and stabilize the radicals. While the structure showing a polar effect can be embodied by any substituent showing a polar effect, $R^5$ is preferably a "substituent having an aromatic ring and showing a polar effect".

Such a "substituent having an aromatic ring and showing a polar effect" is preferably an aromatic group having 6 to 20 carbon atoms or an aralkyl group having 7 to 20 carbon atoms, more preferably an aromatic group having 6 to 14 carbon atoms or an aralkyl group having 7 to 15 carbon atoms, and even more preferably an aromatic group having 6 to 10 carbon atoms or an aralkyl group having 7 to 11 carbon atoms. The number of carbon atoms referred to herein represents the total number of carbon atoms. The aralkyl group means a compound with an alkyl group having an aryl group(s) substituted thereon. Among the aralkyl groups, those having one or two aryl groups substituted on the alkyl group are preferable (in the case of two aryl groups, preferably substitute on the same carbon atom). Examples of the substituent having an aromatic ring and showing a polar effect include phenyl group, naphthyl group, anthracenyl group, benzyl group, and diphenylmethyl group.

Examples of $R^5$ include a phenyl group, a p-chlorophenyl group, a p-tolyl group, a benzyl group, an ethylphenyl group, a m-tolyl group, a p-methoxyphenyl group, a p-trifluoromethylphenyl group, a p-methylbenzyl group, a diphenylmethyl group, and a methylbenzoyl phenylmethyl group.

Among the compounds represented by Formula (1), preferable examples of the compounds are as follows.

Compounds with at least one of $R^1$, $R^3$ or $R^5$ representing a substituent showing a polar effect Compounds with either $R^1$ or $R^3$ representing an aralkyl group The aralkyl group means a compound with an alkyl group having an aryl group(s) substituted thereon. Among the aralkyl groups, those having one or two aryl groups substituted on the alkyl group are preferable (in the case of two aryl groups, preferably substitute on the same carbon atom). The alkyl group also preferably has an aryl group and an acyl group (preferably an aryloyl group) substituted thereon.

Compounds with either $R^1$ or $R^3$ representing a cycloalkyl group-containing group which is preferably a cycloalkyl group Compounds with each $R^1$ or $R^3$ representing a hydrogen atom, in particular, with each of $R^1$ or $R^3$ representing a hydrogen atom, and $R^5$ representing an alkyl group having 1 to 3 carbon atoms A preferable embodiment of the compound represented by Formula (1) is a compound with at least one of $R^1$, $R^3$ or $R^5$ representing a water-soluble group, a compound including a water-soluble functional group, or a compound with $R^1$ and $R^3$ both representing a hydrogen atom. The compound represented by Formula (1) according to the embodiment is preferable since the compound has excellent compatibility with polyvinyl alcohol constituting the polarizer layer.

The water-soluble functional group is a group contributive to the water solubility of the compound represented by Formula (1). Specific examples of the water-soluble functional group owned by the compound represented by Formula (1) include a sulfo group (or salt thereof), a carboxy group (or salt thereof), a hydroxy group, a mercapto group, an amino group, an ammonio group, a sulfonamide group, an acylsulfamoyl group, a sulfonylsulfamoyl group, an activated methine group, and a substituent containing any of these groups. Preferable examples thereof include a sulfo group (or salt thereof), a carboxy group (or salt thereof), a hydroxy group, and an amino group.

The carboxy group, the sulfonamide group, and the sulfo group may exist in the form of salt. Examples of the counter ion which forms the salt include ammonium ions, alkali metal ions (for example, lithium ions, sodium ions, and potassium ions) and organic cations (for example, tetramethylammonium ions, tetramethylguanidium ions, tetramethylsulfonium ions). Among these counter ions, alkali metal ions are preferable.

In addition, there is given an embodiment in which both $R^1$ and $R^3$ represent a hydrogen atom as the group contributive to the water solubility of the compound represented by Formula (1) as an example. With this configuration, the water solubility of the compound represented by Formula (1) is enhanced.

In addition, the compound represented by Formula (1) may be used in the form of hydrate, solvate or salt. In the present invention, the hydrate may include an organic solvent, and the solvate may include water. That is, the "hydrate" and "solvate" include "mixed solvate" containing both of water and an organic solvent.

Examples of the solvent included in the solvate include any of general organic solvents. Specific examples thereof include alcohols (such as methanol, ethanol, 2-propanol, 1-butanol, 1-methoxy-2-propanol and t-butanol), esters (such as ethyl acetate), hydrocarbons (both of aliphatic and aromatic hydrocarbons are acceptable, such as toluene, hexane and heptane), ethers (such as diethyl ether and tetrahydrofuran), nitriles (such as acetonitrile), and ketones (such as acetone and 2-butanone). Alcoholic solvate is preferable, and methanol, ethanol, 2-propanol and 1-butanol are more preferable. These solvents may be any of reaction solvents used at the time of synthesizing the compound represented by Formula (1) in the present invention, may be solvents used at the time of crystallization and purification after the synthesis, or may be mixtures thereof.

In addition, two or more solvents may concurrently be included or water may be included in the solvent (for example, water and alcohol (such as methanol, ethanol, and t-butanol)).

The salt includes an acid addition salt composed of an inorganic or organic acid. Examples of the inorganic acid include hydrohalogenic acids (hydrochloric acid, hydrobromic acid), sulfuric acids and phosphoric acids. Examples of the organic acid include acetic acid, trifluoroacetic acid, oxalic acid and citric acid, and further include alkanesulfonic acids (methanesulfonic acid), and arylsulfonic acids (benzenesulfonic acid, 4-toluenesulfonic acid, 1,5-naphthalenedisulfonic acid).

In addition, examples of the salt include salts formed when the acidic moiety present in the parent compound is substituted by a metal ion (such as alkali metal salt including sodium and potassium salts, alkali earth metal salt including calcium and magnesium salts, alkali earth metal ion, or aluminum ion), or when prepared using an organic base (ethanolamine, diethanolamine, triethanolamine, morpholine, piperidine, ammonium salt), but not limited thereto. Among them, sodium salt and potassium salt are preferable.

The salt of the compound represented by Formula (1) normally exists, for example, in the case of sodium salt, in the form of tautomers shown below as an example. However, note that the tautomers are assumed as identical in the present invention, without discriminating them, and are represented by either one structure in specific examples.

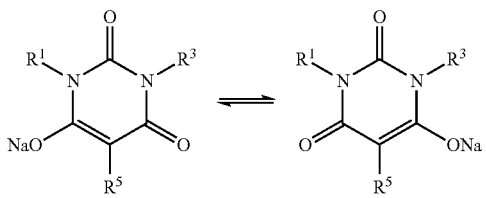

The degree of hydrophilicity of the compound represented by Formula (1) can be expressed as a C log P value. P in C log P represents a distribution coefficient in an n-octanolwater system and can be measured using n-octanol and water. The distribution coefficient may be obtained as an estimated C log P value using C log P value estimation program (C LOG P program installed on PC Models from Daylight Chemical Information Systems, Inc.). The C log P value is preferably within a range of −8.0 to 12.0, more preferably within a range of −5.0 to 10.0, and even more preferably within a range of −5.0 to 8.0.

Hereinafter, specific examples of the compound represented by Formula (1) or the like will be shown but the present invention is not limited thereto. In the compounds shown below, Me represents a methyl group.

A-1

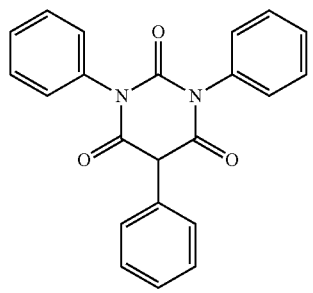

A-2

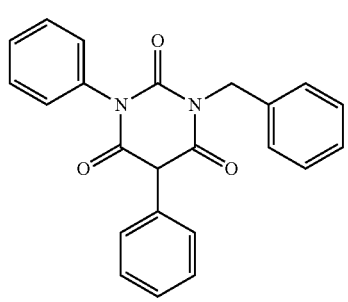

A-3

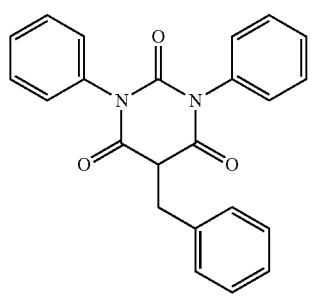

A-4

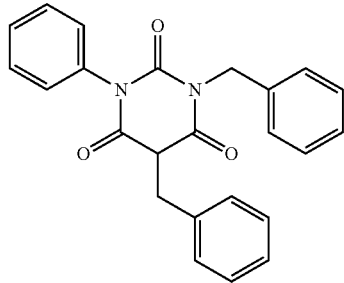

A-5

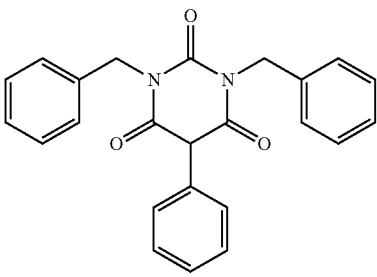

A-6

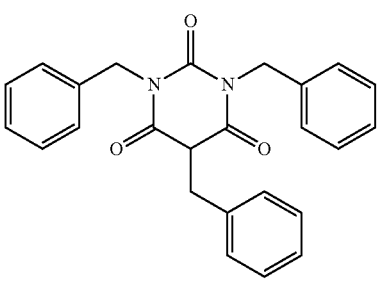

A-7

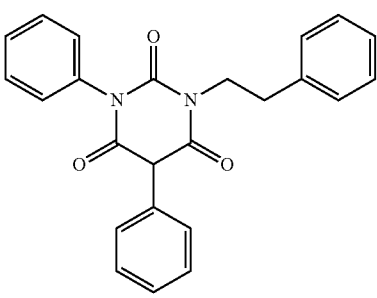

A-8

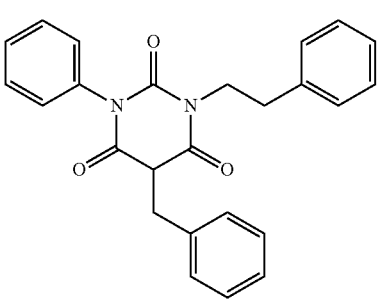

A-9

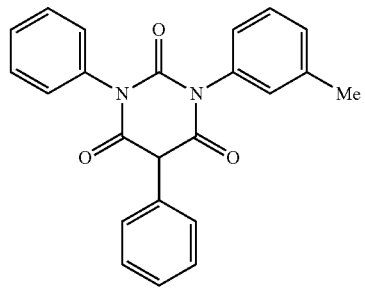

-continued
A-10
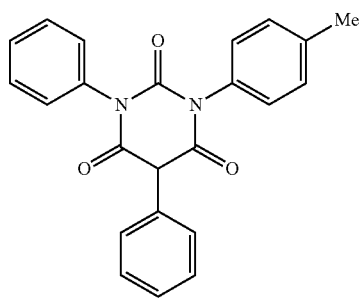
A-11
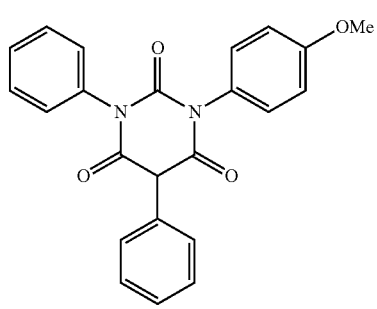
A-12
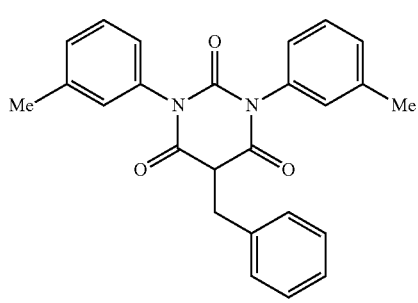
A-13
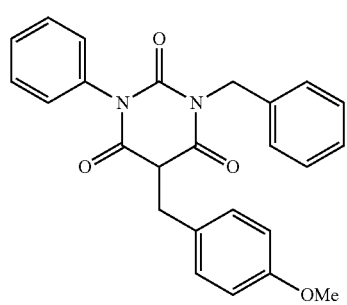
A-14
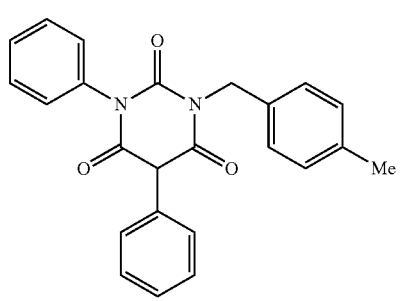
-continued
A-15
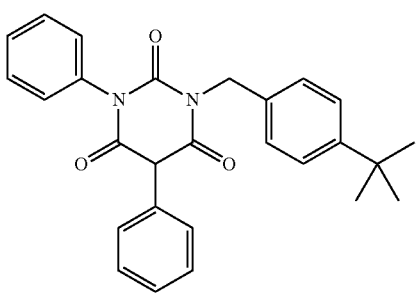
A-16
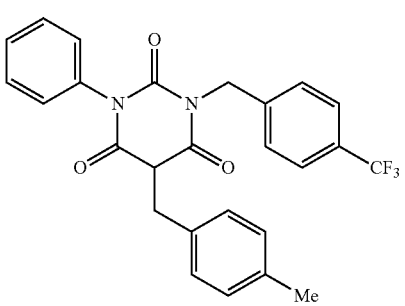
A-17
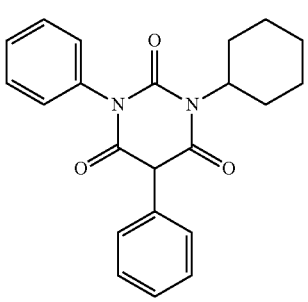
A-18
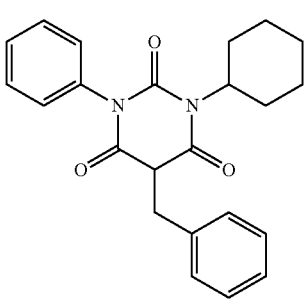
A-19
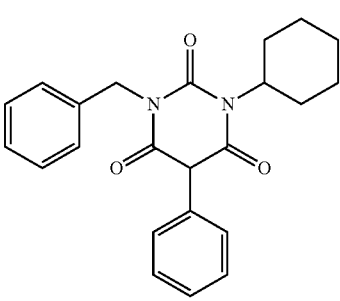

-continued
A-20
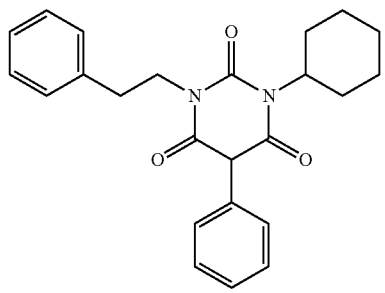
A-21
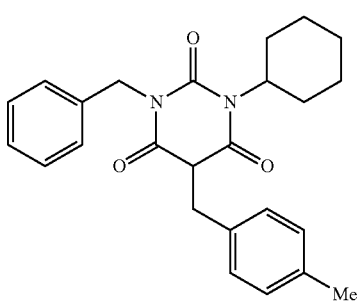
A-22
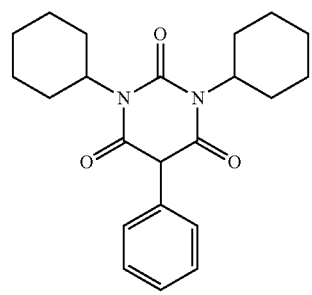
A-23
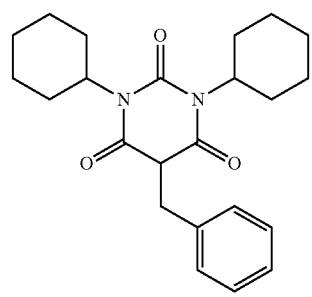
A-24
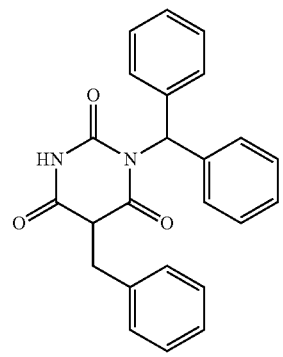
-continued
A-25
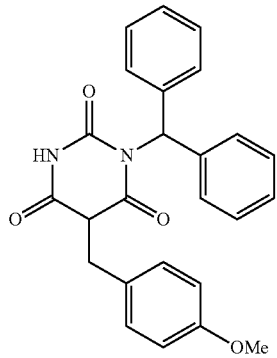
A-26
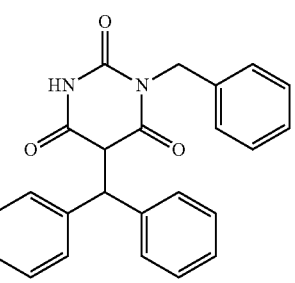
A-27
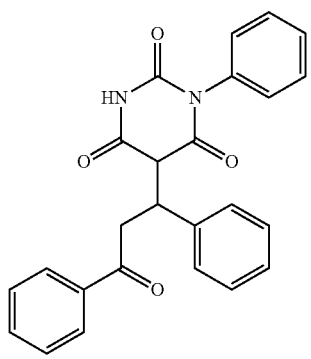
A-28
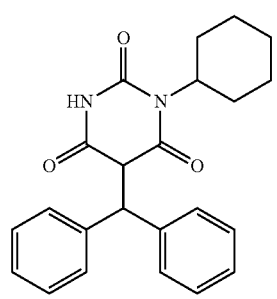
A-29
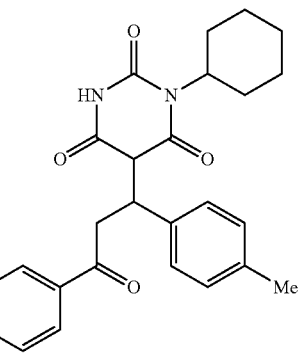

-continued
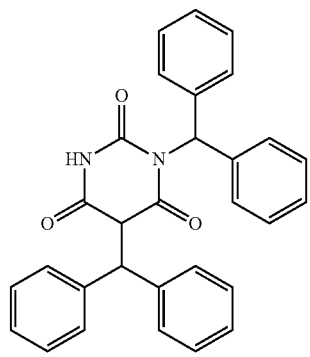
(A-30)
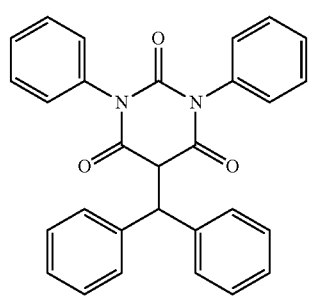
(A-31)
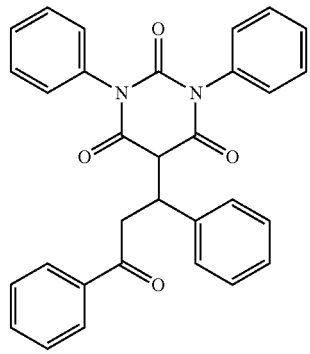
(A-32)
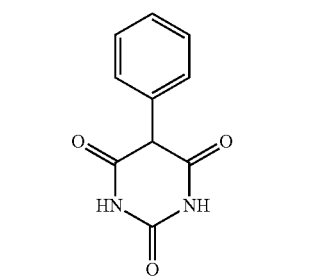
(A-33)
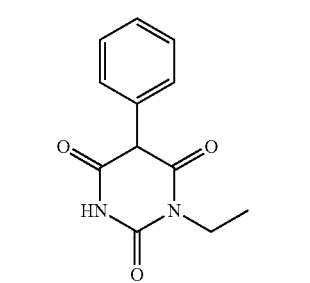
(A-34)
-continued
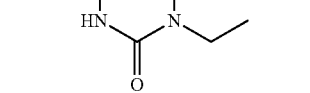
(A-35)
(A-36)
(A-37)
(A-38)
(A-39)

-continued
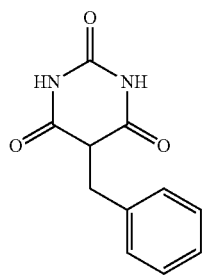 (A-40)
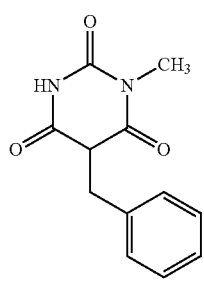 (A-41)
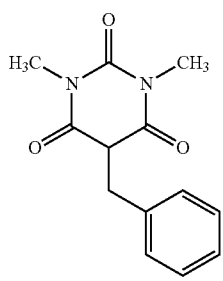 (A-42)
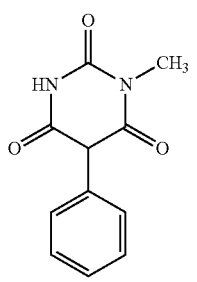 (A-43)
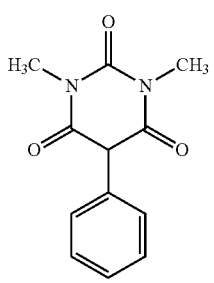 (A-44)
-continued
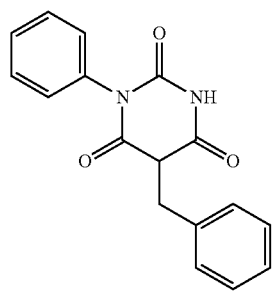 (A-45)
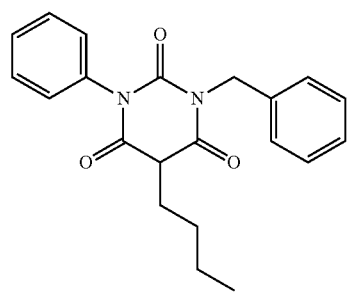 (A-46)
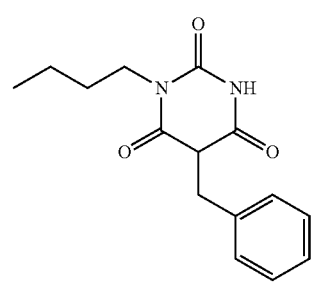 (A-47)
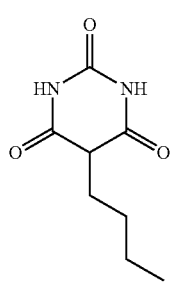 (A-48)
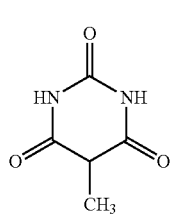 (A-49)
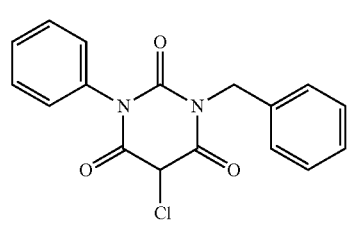 (A-50)

(A-51)
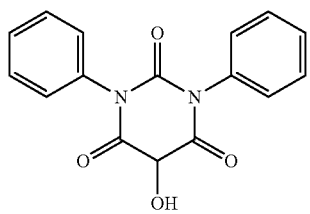
(A-52)
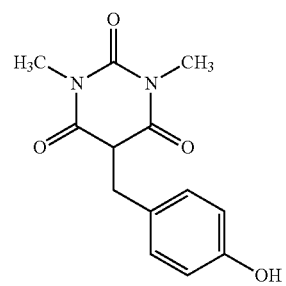
(A-53)
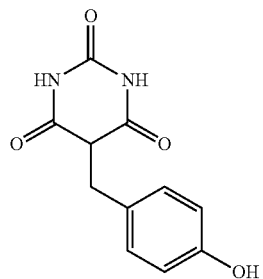
(A-54)
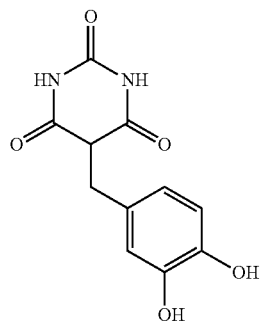
(A-55)
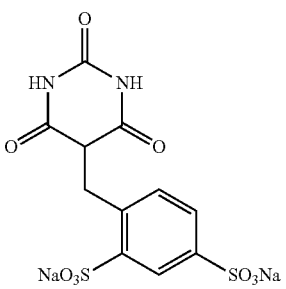
(A-56)
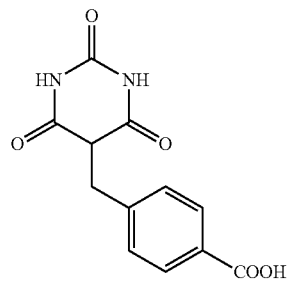
(A-57)
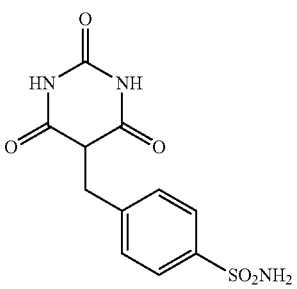
(A-58)
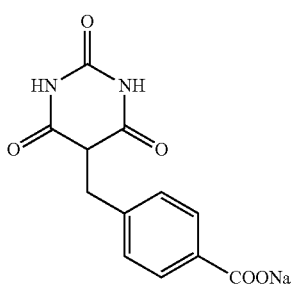
(A-59)
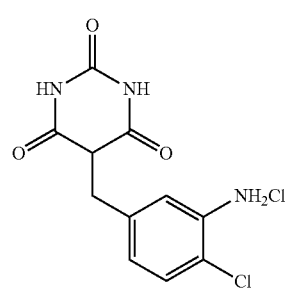
(A-60)
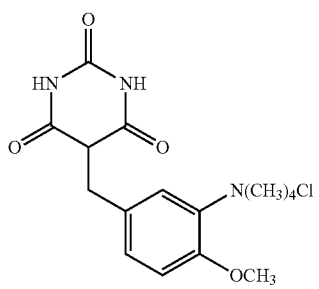

(A-61) 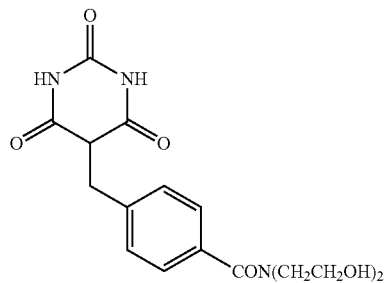
(A-62) 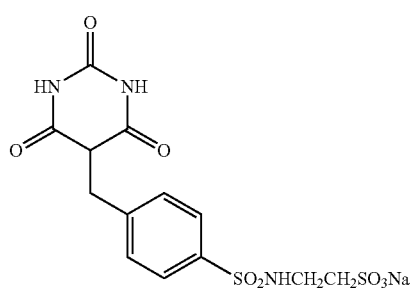
(A-63) 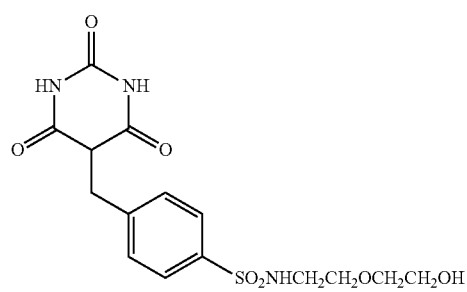
(A-64) 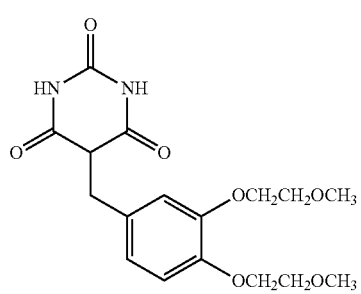
(A-65) 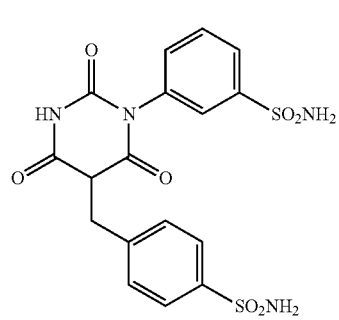
(A-66) 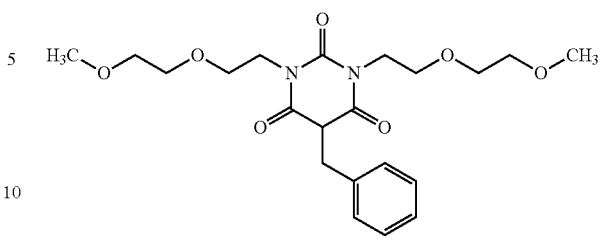
(A-67) 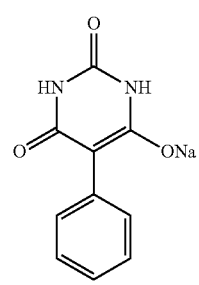
(A-68) 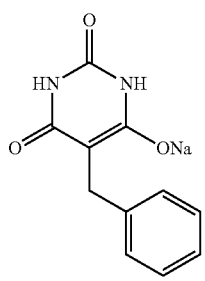
(A-69) 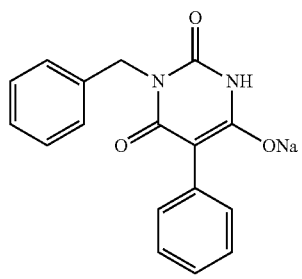
(A-70) 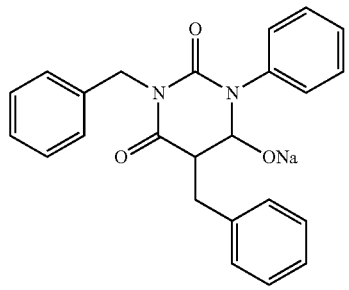

(A-71)
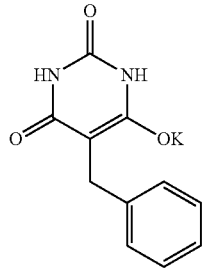
(A-72)
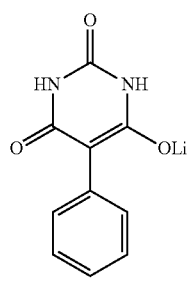
(A-73)
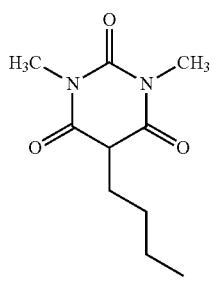
(A-74)
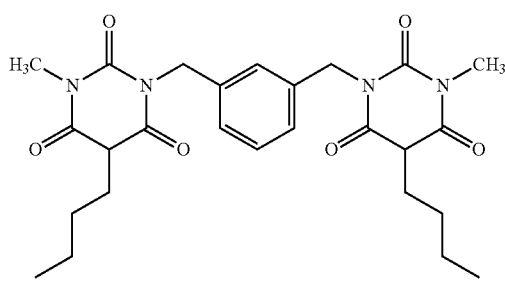
(A-75)
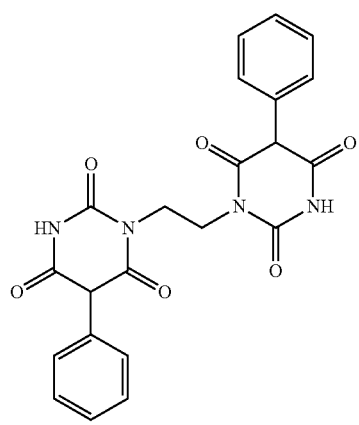
(A-76)
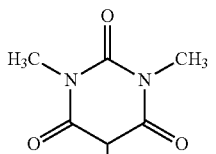
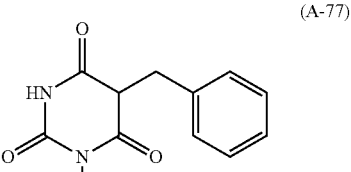
(A-77)
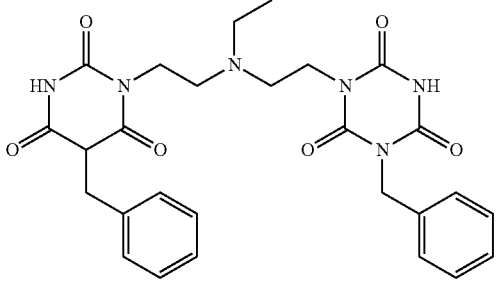
(A-78)
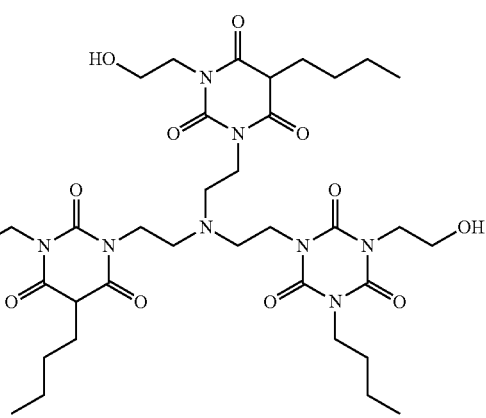

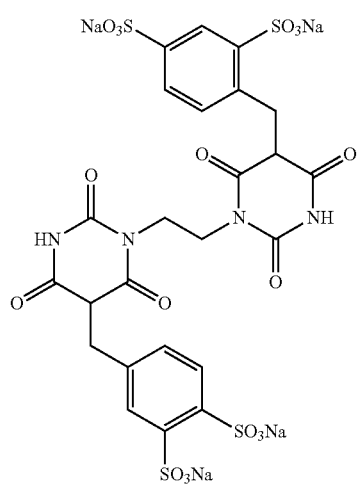
(A-79)
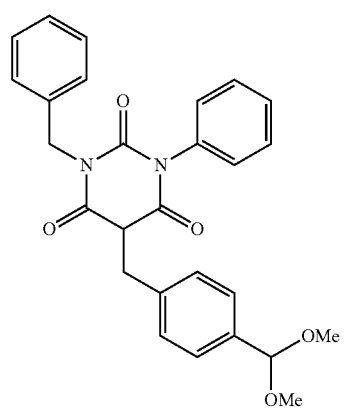
A-83
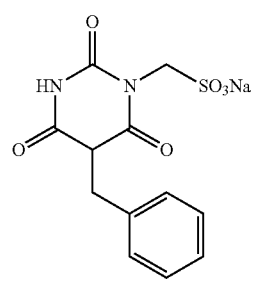
(A-80)
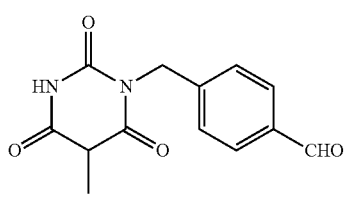
A-84
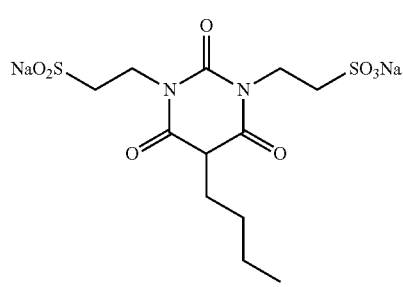
(A-81)
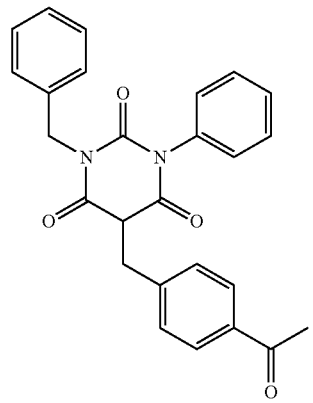
A-85
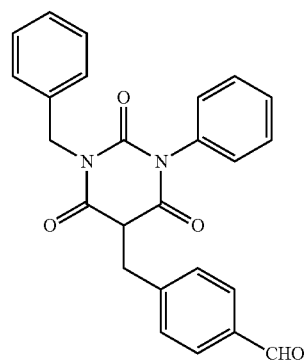
A-82
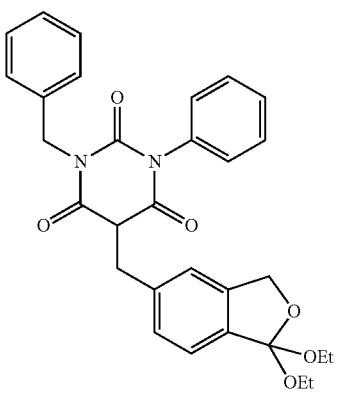
(A-86)

(A-87)
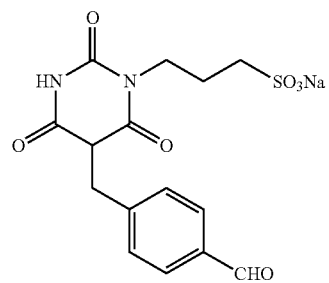
(A-88)
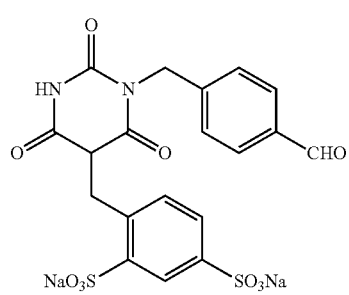
(A-89)
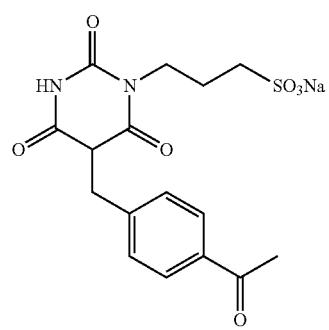
(A-90)
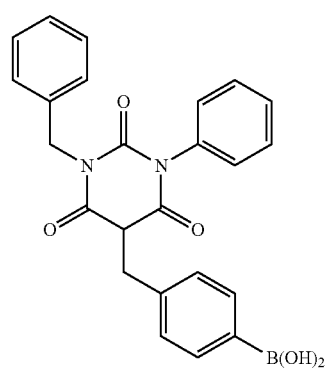
(A-91)
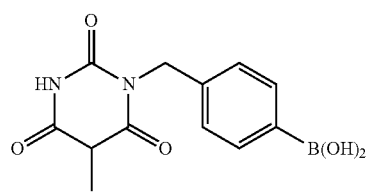
(A-92)
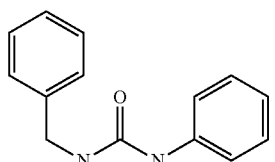
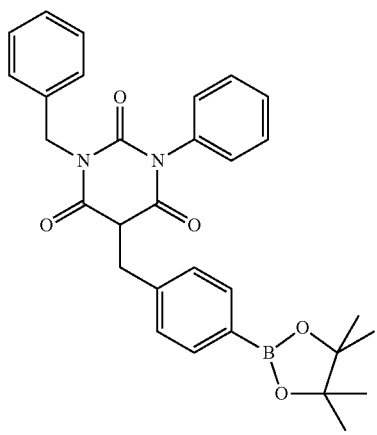
(A-93)
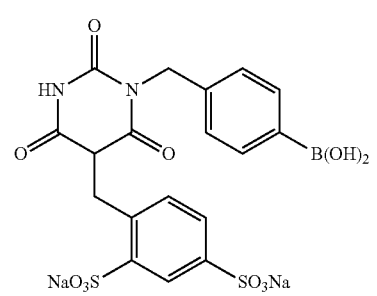
(A-94)
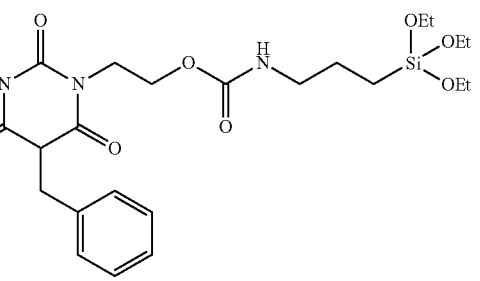
(A-95)
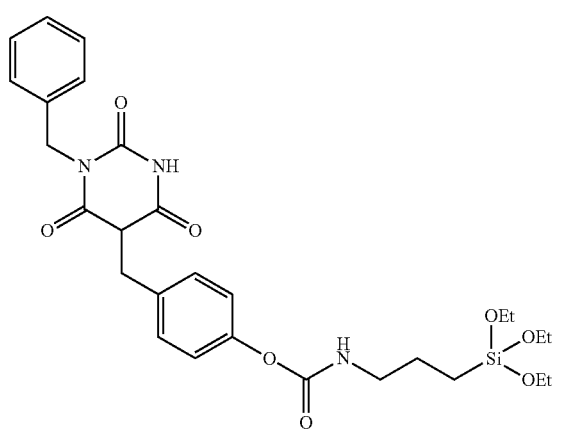

(A-96)
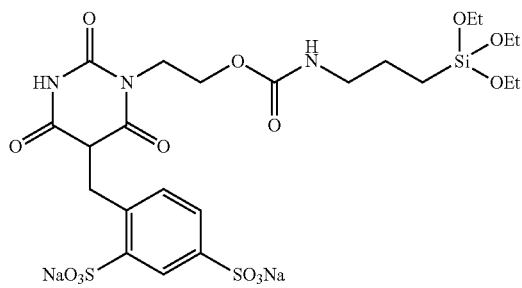

(A-97)
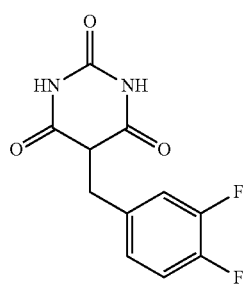

(A-98)
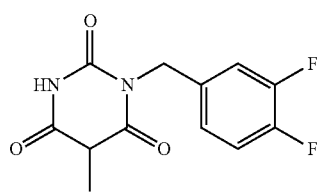

(A-99)
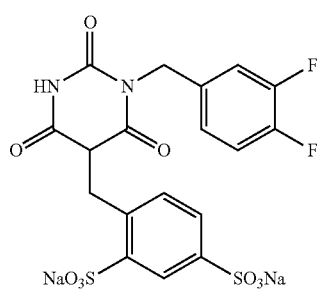

(A-100)
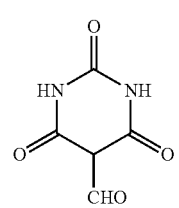

(A-101)
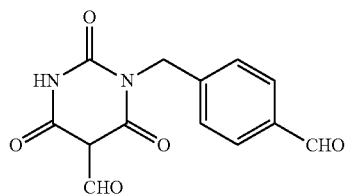

(A-102)
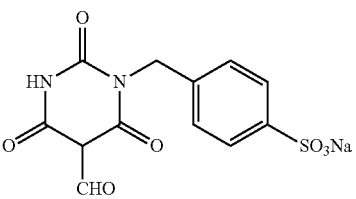

Since the compound represented by Formula (1) has a barbituric acid structure, the compound can be synthesized by a method of synthesizing barbituric acid, based on condensation of a urea derivative with a malonic acid derivative. The compound having two substituents on the nitrogen atoms can be obtained by heating a N,N'-disubstitued urea with malonic chloride, or by heating with a combination of malonic acid and an activator such as acetic anhydride. For example, as the synthesizing method, methods described in Journal of the American Chemical Society, vol. 61, p. 1015 (1939), Journal of Medicinal Chemistry, vol. 54, p. 2409 (2011), Tetrahedron Letters, vol. 40, p. 8029 (1999), and WO2007/150011A are preferably used.

In addition, both unsubstituted and substituted malonic acids are acceptable for use in the condensation. By using malonic acid having any of correspondent substituents for $R^5$ so as to configure barbituric acid, the compound represented by Formula (1) can be synthesized. Further, the compound represented by Formula (1) may be synthesized alternatively by modifying barbituric acid unsubstituted at the 5-position, which is obtainable by condensing unsubstituted malonic acid with a urea derivative.

The 5-position may be modified by a nucleophilic substitution reaction with halogenated alkyl or the like, or by an addition reaction such as the Michael addition reaction. In addition, a method of using dehydrating condensation with an aldehyde or ketone to produce an alkylidene or arylidene compound and then reducing the double bond is preferably used. The methods preferably used herein are described in, for example, Organic Letters, vol. 5, p. 2887 (2003). Journal of Medicinal Chemistry, vol. 17, p. 1194 (1974), Journal of Organic Chemistry, vol. 68, p. 4684 (2003), Tetrahedron Letters, vol. 42, p. 4103 (2001), Journal of the American Chemical Society, vol. 119, p. 12849 (1997), and Tetrahedron Letters, vol. 28, p. 4173 (1987).

The methods of synthesizing the compound represented by Formula (1) are not limited to those described above.

Examples of the compound having a barbituric acid structure and exhibiting a polyiodide ion $I_5^-$ forming ability include the following compounds.

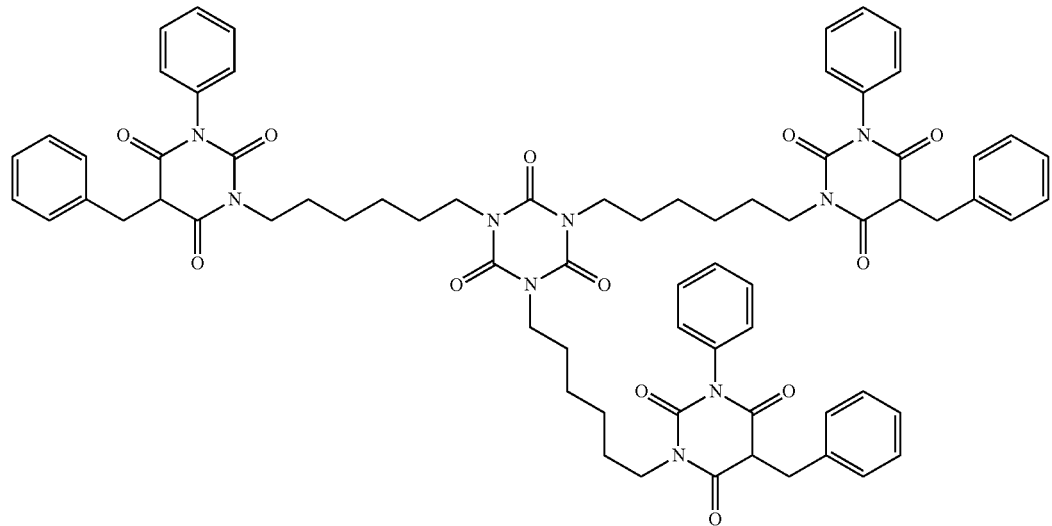
(A-103)
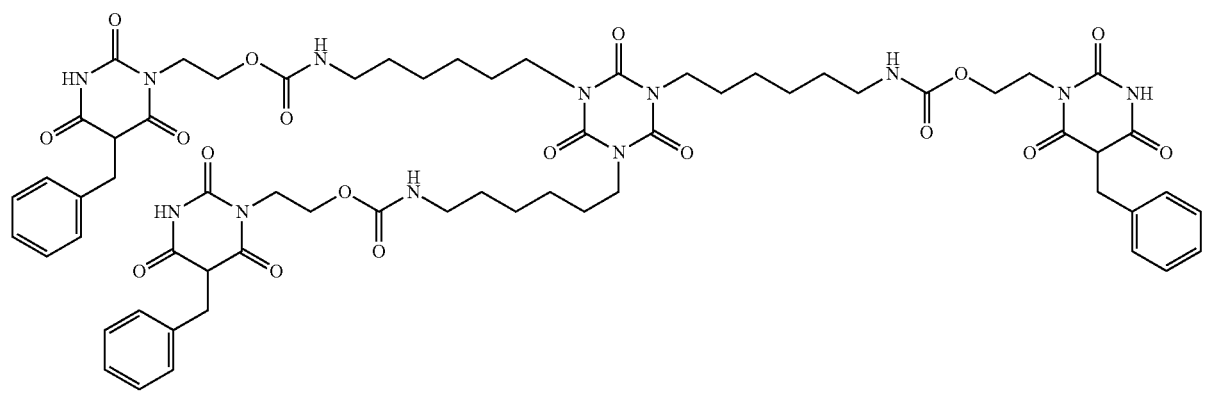
(A-104)
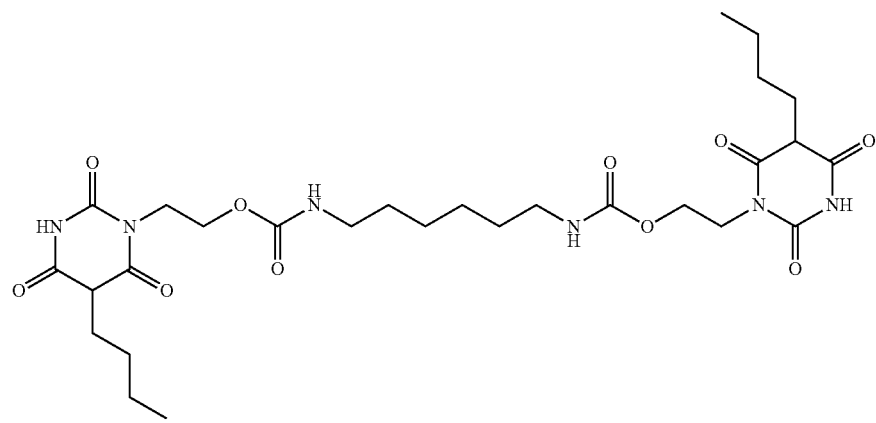
(A-105)
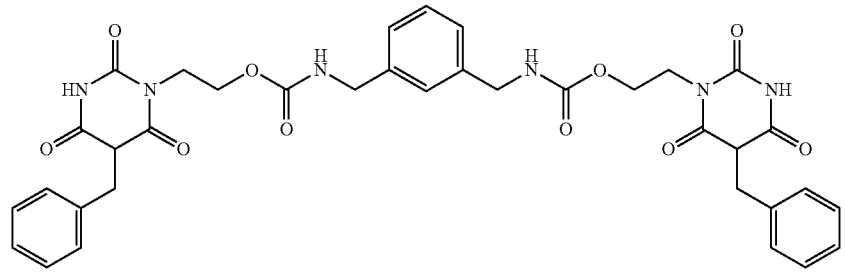
(A-106)

-continued
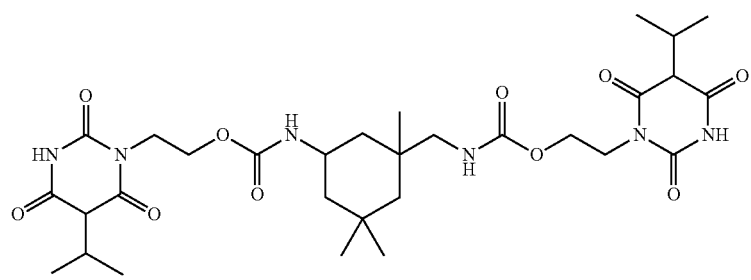
(A-107)
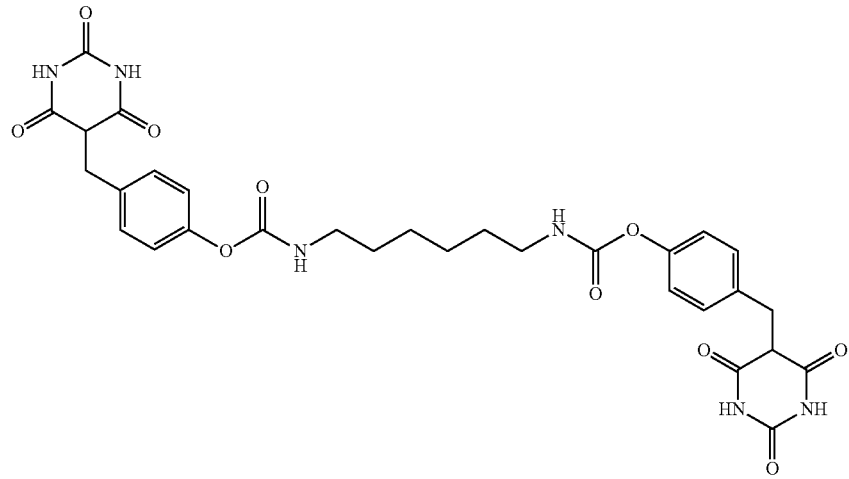
(A-108)
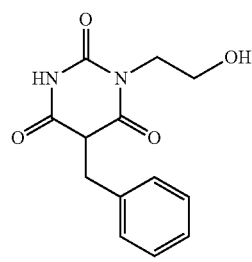
(A-109)
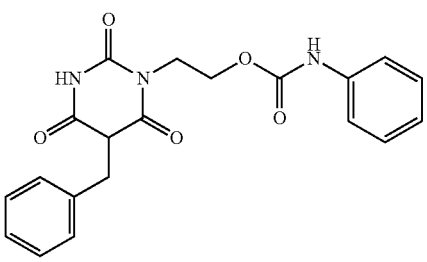
(A-110)
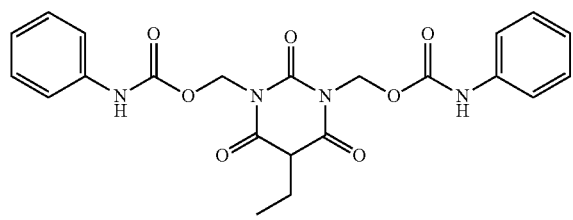
(A-111)
TABLE 1
| Compound No. | R¹ | R³ | R⁵ |
|---|---|---|---|
| BA-101 | H | H | $C_2H_5$ |
| BA-102 | H | H | $C_3H_7$ |
| BA-103 | H | H | $CHPh_2$ |
| BA-104 | H | H | $CH_2C_6H_4(p\text{-}CH_3)$ |
| BA-105 | H | H | $CH_2C_6H_4(p\text{-}OCH_3)$ |
| BA-106 | H | H | $CH_2C_6H_4(p\text{-}Cl)$ |

TABLE 1-continued

| Compound No. | R¹ | R³ | R⁵ |
|---|---|---|---|
| BA-107 | H | CH₂Ph | NHCOCH₃ |
| BA-108 | H | CH₂Ph | NHCHO |
| BA-109 | H | CH₂Ph | iC₃H₇ |
| BA-110 | H | CH₂Ph | sec-C₄H₉ |
| BA-111 | H | CH₂Ph | tert-C₄H₉ |
| BA-112 | H | CH₂Ph | CH₂Ph |
| BA-113 | H | CHPh₂ | Ph |
| BA-114 | H | cHex | cHex |
| BA-115 | Ph | Ph | cPentyl |
| BA-116 | Ph | Ph | CH₂-cPentyl |
| BA-117 | Ph | Ph | n-C₄H₉ |
| BA-118 | Ph | Ph | CH(CH₃)Ph |
| BA-119 | Ph | Ph | CH₂CH=CH₂ |
| BA-120 | Ph | C₆H₄(p-OCH₃) | CH₂Ph |
| BA-121 | Ph | CH₂Ph | CH₂CH₂Ph |
| BA-122 | Ph | Ph | CH₂CH₂CN |
| BA-123 | Ph | Ph | CH₂CH₂COOC₂H₅ |
| BA-124 | Ph | Ph | OCH₃ |

In Table 1, Ph represents a phenyl group, cHex represents a cyclohexyl group, cPentyl represents a cyclopentyl group, $C_6H_4$ represents a phenylene group, the group in parentheses such as $C_6H_4(p-CH_3)$ represents a substituent to a phenyl group, and "p-" represents a p-position.

Hereinafter, other specific embodiments of the compound exhibiting a polyiodide ion $I_5^-$ forming ability will be described but the present invention is not limited to the following specific embodiments.

(Compound Represented by Formula (I))

$$\underset{H\quad R}{EWG^1\diagdown C \diagup EWG^2}$$ Formula (I)

In Formula (I), R represents a substituent but does not represent a group including a phenolic hydroxyl group or an aromatic amino group. $EWG^1$ and $EWG^2$ each independently represent an electron-withdrawing group. $EWG^1$ and $EWG^2$ may be bonded to form a ring. However, a ring is not formed by bonding $EWG^1$ and $EWG^2$ to each other to form the following linking group and bonding the group to a carbon atom in which R is substituted.

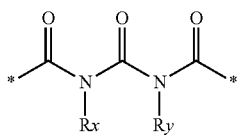

Herein, Rx and Ry each independently represent a hydrogen atom or a substituent. The symbol * indicates a bonding position to a carbon atom in which R is substituted. In addition, $EWG^1$ and R or $EWG^2$ and R may be bonded to form a ring.

Herein, the electron-withdrawing group in $EWG^1$ and $EWG^2$ is preferably a group having a σp value of the Hammett's rule of greater than 0. Examples of the σp value for a positive substituent include halogen atoms such as fluorine (0.06), chlorine (0.30), bromine (0.27), and iodine (0.30), carbonyl substituents such as —CHO (0.22), —COCH₃ (0.50), —COC₆H₅ (0.46), —CONH₂ (0.36), —COO— (0.30), —COOH (0.41). —COOCH₃ (0.39), and —COOC₂H₅ (0.45), sulfonyl or sulfinyl substituents such as —SOCH₃ (0.49), —SO₂CH₃ (0.72), —SO₂C₆H₅ (0.68), —SO₂CF₃ (0.93). —SO₂NH₂ (0.57), —SO₂OC₆H₅ (0.23), —SO₃⁻ (0.09), and —SO₃H (0.50), nitrogen-containing substituents such as —CN (0.66), —NO₂ (0.78), —N(CH₃)₃⁺ (0.82), and —N(CF₃)₂ (0.53), and halogen atom substitution alkyl groups such as —CCl₃ (0.46), —CH₂Cl (0.18), —CHCl₂ (0.32), and —CF₃ (0.54). Values in parentheses here indicate the σp values.

The σp value of Hammett is described in, for example, C. Harsch et al., J. Med. Chem., 16, 1207 (1973), ibid, 20, 304 (1977), Chem. Rev. 91, 165 (1991) and the like.

The σp value of Hammett for the electron-withdrawing group in $EWG^1$ and $EWG^2$ is preferably 0.20 or greater. Specific preferable examples of the electron-withdrawing group include an acyl group, an alkoxycarbonyl group, an aryloxycarbonyl group, an alkyl- or arylcarbamoyl group (for example, —CONHCH₃ (0.32)), a thioacyl group, an alkoxy thiocarbonyl group, an aryloxy thiocarbonyl group, an alkyl- or arylthiocarbamoyl group (for example, —CSNHCH₃ (0.34)), an alkyl- or arylsulfamoyl group (for example, —SO₂N(CH₃)₂ (0.65)), an alkyl- or arylsulfonyl group (for example, —SO₂CH₃ (0.72), —SO₂C₆H₅ (0.68)), an alkyl- or arylsulfinyl group (for example, —SOCH₃ (0.49)), a cyano group, a nitro group, and a phosphono group, and these groups are preferable. An acyl group, an alkoxy carbonyl group, an aryloxycarbonyl group, an alkyl- or arylcarbamoyl group, an alkyl- or arylsulfamoyl group, an alkyl- or arylsulfonyl group, an alkyl- or arylsulfinyl group, a cyano group, a nitro group, and a phosphono group are more preferable.

The acyl group may be an aromatic acyl group, an aliphatic acyl group or an acyl group including a formyl group and preferably having 1 to 20 carbon atoms and more preferably having 2 to 10 carbon atoms.

Examples of the acyl group include formyl, acetyl, propionyl, isobutyryl, pivaloyl, lauroyl, myristoyl, acryloyl, methacryloyl, benzoyl, and naphthoyl.

Among these acyl groups, a branched alkyl acyl group (preferably a tert-alkyl carbonyl group), for example, pivaloyl, and a phenylcarbonyl group having a substituent at the ortho-position are preferable.

The number of carbon atoms in the alkoxycarbonyl group is preferably 2 to 20 and more preferably 2 to 10. The alkoxycarbonyl group is preferably a branched alkoxycarbonyl group and more preferably a tert-alkyloxy carbonyl group. Examples of the alkoxycarbonyl group include methoxycarbonyl, ethoxycarbonyl, isopropoxycarbonyl, tert-butyloxycarbonyl, n-octyloxycarbonyl, and dodecyloxycarbonyl.

The number of carbon atoms in the aryloxycarbonyl group is preferably 7 to 20 and more preferably 7 to 16. Examples of the aryloxycarbonyl group include phenyloxycarbonyl and naphthyloxycarbonyl.

The alkoxycarbonyl group is more preferable than the aryloxycarbonyl group.

The number of carbon atoms in the carbamoyl group in which at least one hydrogen atom is substituted with a group independently selected from an alkyl group and an aryl group is preferably 1 to 20 and more preferably 1 to 10.

Examples of the carbamoyl group include carbamoyl, N-methylcarbamoyl, N,N-dimethylcarbamoyl, N-phenylcarbamoyl, N,N-diphenylcarbamoyl, and N-methyl-N-phenylcarbamoyl.

The number of carbon atoms in the alkyl or arylsulfonyl group is preferably 1 to 20 and more preferably 1 to 10.

Examples of the sulfonyl group include methylsulfonyl, isopropylsulfonyl, tert-butylsulfonyl, tert-octylsulfonyl, and phenylsulfonyl.

The number of carbon atoms in the alkyl- or arylsulfinyl group is preferably 1 to 20 and more preferably 1 to 10.

Examples of the sulfynyl group include methylsulfinyl, isopropylsulfinyl, tert-butylsulfinyl, tert-octylsulfinyl, and phenylsulfinyl.

The phosphono group is represented by $-P(=O)(ORb)_2$ and Rb represents a substituent. A preferable substituent Rb will be described later.

The thioacyl group, the alkoxy thiocarbonyl group, the aryloxy thiocarbonyl group, and the thiocarbamoyl group in which at least one hydrogen atom is substituted with a group independently selected from an alkyl group and an aryl group (preferable ranges and specific examples thereof include substituents in which the $C(=O)$ moiety of the corresponding acyl group, alkoxy carbonyl group, aryloxycarbonyl group, or carbamoyl group in which at least one hydrogen atom is substituted with a group independently selected from an alkyl group and an aryl group is substituted with $(C=S)$) may be used.

In the case in which $EWG^1$ and $EWG^2$ are bonded to form a ring, a moiety to be bonded to a carbon atom to which R is bonded is preferably $-C(=O)-$, $-C(=S)-$, $-SO_2-$, $-SO-$ or $*-P(=O)(ORb)O-$. Herein, the symbol * indicates a bonding position to a carbon atom to which R is bonded, and Rb represents a substituent. In this case, $-C(=O)-$ or $-C(=S)-$ is more preferable and $-C(=O)-$, $-C(=O)-$ or $-C(=S)-$ is even more preferable. Among these, $-C(=O)-$ is preferable.

An example of the substituent in R, Rx, and Ry is the following substituent S.

However, R does not represents a group including a phenolic hydroxyl group or an aromatic amino group in the substituent and a group including $-NH_2$.

Substituent S: Examples of the substituent S include an alkyl group (preferably an alkyl group having 1 to 20 carbon atoms, for example, methyl, ethyl, isopropyl, tert-butyl, pentyl, heptyl, 1-ethylpentyl, 2-ethylhexyl, benzyl, 2-ethoxyethyl, or 1-carboxymethyl), an alkenyl group (preferably an alkenyl group having 2 to 20 carbon atoms, for example, vinyl, allyl, or oleyl), an alkynyl group (preferably an alkynyl group having 2 to 20 carbon atoms, for example, ethynyl, butadiynyl, or phenylethynyl), a cycloalkyl group (preferably a cycloalkyl group having 3 to 20 carbon atoms, for example, cyclopropyl, cyclopentyl, cyclohexyl, or 4-methylcyclohexyl), an aryl group (preferably an aryl group having 6 to 20 carbon atoms, for example, phenyl, 1-naphthyl, 4-methoxyphenyl, 2-chlorophenyl, or 3-methylphenyl), a heterocyclic group (preferably a heterocyclic group having 0 to 20 carbon atoms, in which the ring-constituting hetero atom may be preferably an oxygen atom, a nitrogen atom or a sulfur atom, the ring may be condensed with a 5-membered or 6-membered ring, for example, a benzene ring or a hetero ring, and the ring may be a saturated ring, an unsaturated ring or an aromatic ring, for example, 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, for example, methoxy, ethoxy, isopropyloxy or benzyloxy), an aryloxy group (preferably an aryloxy group having 6 to 20 carbon atoms, for example, phenoxy, 1-naphthyloxy, 3-methylphenoxy or 4-methoxyphenoxy), an alkylthio group (preferably an alkylthio group having 1 to 20 carbon atoms, for example, methylthio, ethylthio, isopropylthio or benzylthio), an arylthio group (preferably an arylthio group having 6 to 20 carbon atoms, for example, phenylthio, 1-naphthylthio, 3-methylphenylthio or 4-methoxyphenylthio), an acyl group (including an alkylcarbonyl group, an alkenylcarbonyl group, an arylcarbonyl group and a heterocyclic carbonyl group, preferably an acyl group having 20 carbon atoms or less, for example, acetyl, pivaloyl, acryloyl, methacryloyl, benzoyl or nicotinoyl), an alkoxycarbonyl group (preferably an alkoxycarbonyl group having 2 to 20 carbon atoms, for example, ethoxycarbonyl or 2-ethylhexyloxycarbonyl), an aryloxycarbonyl group (preferably an aryloxycarbonyl group having 7 to 20 carbon atoms, for example, phenyloxycarbonyl or naphthyloxycarbonyl), an amino group (including an amino group, an alkylamino group, an arylamino group and a heterocyclic amino group, preferably an amino group having 0 to 20 carbon atoms, for example, amino, N,N-dimethylamino, N,N-diethylamino. N-ethylamino, anilino, 1-pyrrolidinyl, piperidino or morpholinyl), an alkyl- or arylsulfonamide group (preferably an alkyl- or arylsulfonamide group having 0 to 20 carbon atoms, for example, N,N-dimethylsulfonamide or N-phenylsulfonamide), an alkyl- or arylsulfamoyl group (preferably a alkyl- or arylsulfamoyl group having 0 to 20 carbon atoms, for example, N,N-dimethylsulfamoyl or N-phenylsulfamoyl), an acyloxy group (preferably an acyloxy group having 1 to 20 carbon atoms, for example, acetyloxy or benzoyloxy), an alkyl- or arylcarbamoyl group (preferably an alkyl- or arylcarbamoyl group having 1 to 20 carbon atoms, for example, N,N-dimethylcarbamoyl or N-phenylcarbamoyl), an acylamino group (preferably an acylamino group having 1 to 20 carbon atoms, for example, acetylamino, acryloylamino, benzoylamino, or nicotinamide), a cyano group, a hydroxy group, a mercapto group, a sulfo group or a salt thereof, a carboxy group or a salt thereof, a phosphate group or a salt thereof, an onio group (for example, a sulfonio group of a sulfonium salt, an ammonio group of an ammonium salt, an iodonio group of an iodonium salt, or a phosphonio group of a phosphonium salt), a thioacyl group, an alkoxy thiocarbonyl group, an aryloxy thiocarbonyl group, an alkyl- or arylthiocarbamoyl group (preferable ranges and specific examples thereof include substituents in which the $C(=O)$ moiety of the corresponding acyl group, alkoxy carbonyl group, aryloxycarbonyl group, or alkyl- or arylthiocarbamoyl group is substituted with $(C=S)$), and a halogen atom (for example, a fluorine atom, a chlorine atom, a bromine atom or an iodine atom).

These substituents may be further substituted with a substituent and an example of such a substituent is the above substituent S.

For example, an aralkyl group in which an alkyl group is substituted with an aryl group, a group in which an alkyl group is substituted with an alkoxy carbonyl group or a cyano group, and the like may be used.

R is preferably an alkyl group, an alkenyl group, a cycloalkyl group, a cycloalkenyl group, an aryl group, a nitro group, a heterocyclic group, or a halogen atom, more preferably an alkyl group, an alkenyl group, a cycloalkyl group, a cycloalkenyl group, an aryl group, a nitro group, or a halogen atom, and even more preferably an alkyl group, an alkenyl group, a cycloalkyl group, a cycloalkenyl group, or an aryl group.

The number of carbon atoms in the alkyl group in R is preferably 1 to 20, more preferably 1 to 10, and even more preferably 1 to 5.

Examples of the alkyl group include a methyl group, an ethyl group, an isopropyl group, a n-butyl group, a tert-butyl group, a 2-ethylhexyl group, an n-octyl group, an n-decyl group, an n-octadecyl group, and an isooctadecyl group.

The number of carbon atoms in the alkenyl group in R is preferably 2 to 20, more preferably 2 to 10, and even more preferably 2 to 5.

Examples of the alkenyl group include vinyl, allyl, isopropenyl, 2-pentenyl, and oleyl.

The number of carbon atoms in the cycloalkyl group in R is preferably 3 to 20, more preferably 5 to 10, and even more preferably 5 or 6.

Examples of the cycloalkyl group include cyclopropyl, cyclopentyl, and cyclohexyl.

The number of carbon atoms in the cycloalkenyl group in R is preferably 5 to 20, more preferably 5 to 10, and even more preferably 5 or 6.

Examples of the cycloalkenyl group include cyclopentenyl and cyclohexenyl.

The number of carbon atoms in the aryl group in R is preferably 6 to 20, more preferably 6 to 10, and even more preferably 6 to 8.

Examples of the aryl group include phenyl and naphthyl.

The number of carbon atoms in the heterocyclic group in R is preferably 0 to 20, more preferably 1 to 10, even more preferably 2 to 10, and particularly preferably 2 to 5.

The hetero ring of the heterocyclic group is preferably 5-memebred or 6-membered ring and the hetero ring may be substituted with a substituent or may be condensed with a benzene ring, an aliphatic ring, or a heterocyclic ring. Herein, as the substituent, the above substituent S may be used.

The hetero atom constituting the hetero ring in the heterocyclic group may be a nitrogen atom, an oxygen atom, or a sulfur atom. The hetero ring may be an aromatic hetero ring or a non-aromatic hetero ring.

Examples of the hetero atom constituting the hetero ring of the heterocyclic group include a thiophene ring, a furan ring, a pyrrole ring, a pyrazole ring, an imidazole ring, a thiazole ring, an oxazole ring, a triazole ring, a tetrazole ring, a pyridine ring, a pyrazine ring, a pyrrolidine ring, a pyrroline ring, a pyrazolidine ring, a piperidine ring, a piperazine ring, a morpholine ring, a thiomorpholine ring, and a benzene-condensed ring of these rings (for example, an indole ring or a benzimidazole ring).

Examples of the halogen atom in R include a fluorine atom, a chlorine atom, and a bromine atom.

Any of $EWG^1$, $EWG^2$, and R in Formula (I) is preferably a group having at least one ring structure.

A preferable embodiment of the compound represented by Formula (I) may be a compound represented by Formula (II) below.

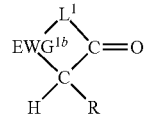

Formula (II)

In Formula (II), R has the same meaning as R in Formula (I) and a preferable range thereof is also the same as that of R in Formula (I). $EWG^{1a}$ and $EWG^{2a}$ each independently represent a divalent electron-withdrawing group. L represents a single bond or a divalent linking group. Each of these groups may be further substituted with a substituent.

The divalent electron-withdrawing group in $EWG^{1a}$ and $EWG^{2a}$ is preferably —C(=O)—, —SO$_2$—, —SO— or *—P(=O)(ORb)O—. Herein, the symbol * indicates a bonding position to a carbon atom to which R is bonded. Rb represents a substituent. As the substituent, the substituent S mentioned above may be used.

For the divalent linking group in L, the atom of L to be bonded to $EWG^{1a}$ and $EWG^{2a}$ is preferably —C($R^{X1}$X$R^{X2}$)—, —N(Ra)—, —O—, —S—, or —N(Ra)—. Herein, $R^{X1}$ and $R^{X2}$ each independently represents a hydrogen atom or a substituent and Ra represents a hydrogen atom or a substituent.

The substituent in Ra. Rb, $R^{X1}$, and $R^{X2}$ may be the above-described substituent S.

The substituent in Ra is preferably an alkyl group, an alkenyl group, a cycloalkyl group, a cycloalkenyl group, an aryl group, or a heterocyclic group, more preferably an alkyl group, a cycloalkyl group, or an aryl group, and even more preferably an alkyl group. Ra is preferably a hydrogen atom, an alkyl group, a cycloalkyl group, or an aryl group, more preferably a hydrogen atom or an alkyl group, and even more preferably a hydrogen atom.

Rb is preferably an alkyl group, an alkenyl group, a cycloalkyl group, a cycloalkenyl group, an aryl group, or a heterocyclic group, more preferably an alkyl group, a cycloalkyl group, or an aryl group, and even more preferably an alkyl group or an aryl group. Among these, an aryl group is preferable.

The substituent in $R^{X1}$ and $R^{X2}$ is preferably an alkyl group, an alkenyl group, a cycloalkyl group, a cycloalkenyl group, or an aryl group.

$R^{X1}$ and $R^{X2}$ each represent a hydrogen atom, an alkyl group, an alkenyl group, a cycloalkyl group, a cycloalkenyl group, or an aryl group.

The ring formed from $EWG^{1a}$, $EWG^{2a}$, and L is preferably a 5-membered to 8-membered ring, more preferably a 5-membered or 7-membered ring, and even more preferably a 5-membered or 6-membered ring.

A preferable embodiment of the compound represented by Formula (II) may be a compound represented by Formula (III) below.

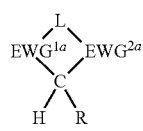

Formula (III)

In Formula (III), R has the same meaning as R in Formula (1) and a preferable range thereof is also the same as that of R in Formula (I). $EWG^{1b}$ represents —C(=O)—, —SO$_2$—, —SO— or *—P(=O)(ORb)O—. Herein, the symbol * indicates a bonding position to a carbon atom in which R is substituted and Rb represents a substituent. $L^1$ represents a divalent linking group. Each of these groups may be further substituted with a substituent.

$EWG^{1b}$ is preferably —C(=O)—, —SO$_2$—, or —SO—, more preferably —C(=O)— or —SO$_2$—, and even more preferably —C(=O)—, For the divalent linking group in $L^1$, the atom of $L^1$ to be bonded to $EWG^{1b}$ and —C(=O)— is preferably —C($R^{X1}$)($R^{X2}$)—, —N(Ra)—, —O—. —S—, or —N(Ra)—. Herein, $R^{X1}$ and $R^{X2}$ each independently represent a hydrogen atom or a substituent and Ra represents a hydrogen atom or a substituent.

$L^1$ has the same meaning as the divalent linking group in L of Formula (II) and a preferable range thereof is also the same as that of the divalent linking group in L of Formula (II).

For the divalent linking group in L and $L^1$, —O—, —S—, —N(Ra)—, —C(=O)—, —C(=S)—, —SO—, —SO—, an alkylene group, an alkenylene group, a cycloalkylene group, a cycloalkenylene group, an arylene group, or a divalent heterocyclic group is preferable. The number of carbon atoms in the alkylene group is preferably 1 to 3, and examples thereof include methylene, ethylene, and propylene. The number of carbon atoms in the alkenylene group is preferably 2 or 3, and examples thereof include ethenylene. The number of carbon atoms in the cycloalkylene group is preferably 5 to 12 and examples thereof include cyclopentylene and cyclohexylene. The number of carbon atoms in the cycloalkenylene group is preferably 5 to 12 and examples thereof include cyclopentenylene and cyclohexenylene. The number of carbon atoms in the arylene group is preferably 6 to 12 and examples thereof include phenylene and naphthylene. The hetero atom constituting the hetero ring in the divalent heterocyclic group is preferably an oxygen atom, a sulfur atom, or a nitrogen atom and the number of carbon atoms is preferably 1 to 12, more preferably 2 to 12, and even more preferably 3 to 12. Examples thereof include a furan ring, a thiophene ring, a pyrrole ring, a pyrazole ring, an imidazole ring, an oxazole ring, a thiazole ring, a pyridine ring, a pyrrolidine ring, a piperazine ring, and a morpholine ring.

In the cycloalkylene group, the cycloalkenylene group, the arylene group, and the divalent heterocyclic ring, two adjacent atoms having an ortho-position relationship are preferable.

—N(Ra)— has the same meaning as the above-described —N(Ra)— and a preferable range thereof is also the same as that of the above-described —N(Ra)—.

L is preferably a single bond, —O—, —S—, —N(Ra)—, —C(=O)—, —C(=S)—, —SO2-, —SO—, an alkylene group, an alkenylene group, a cycloalkylene group, a cycloalkenylene group, or an arylene group.

$L^1$ is preferably —O—, —S—, —N(Ra)—, —C(=O)—, —C(=S)—, —SO$_2$—, —SO—, an alkylene group, an alkenylene group, a cycloalkylene group, a cycloalkenylene group, or an arylene group.

A ring formed from carbon atoms substituted with $EWG^{1b}$, $L^1$, and R is preferably a 5-membered to 8-membered ring, more preferably a 5-membered to 7-membered ring, and even more preferably a 5-memebred or 6-membered ring.

A preferable embodiment of the compound represented by Formula (I) may be a compound represented by Formula (IV) below.

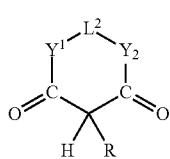

Formula (IV)

In Formula (IV), R has the same meaning as R in Formula (1) and a preferable range thereof is also the same as that of R in Formula (I). $Y^1$ and $Y^2$ each independently represent —C($R^{X1}$)($R^{X2}$)—, —N(Ra)—, —O—, —S— or —N(Ra)—. Herein. $R^{X1}$ and $R^{X2}$ each independently represent a hydrogen atom or a substituent and Ra represents a hydrogen atom or a substituent. $L^2$ represents a single bond or a divalent linking group for bonding $Y^1$ and $Y^2$ with 1 to 3 carbon atoms. $Y^1$ and $Y^2$, $Y^1$ and $L^2$, or $Y^2$ and $L^2$ may be bonded to each other to form a ring. Each of these groups may be further substituted with a substituent.

$L^2$ represents a single bond or a divalent linking group for bonding $Y^1$ and $Y^2$ with 1 to 3 carbon atoms. $R^{X1}$, $R^{X2}$, and Ra have the same meaning as $R^{X1}$, $R^{X2}$, and Ra in Formula (II) above and preferable ranges thereof are also the same as those of $R^{X1}$, $R^{X2}$, and Ra in Formula (II) above.

Among the linking groups exemplified as the divalent linking group for $L^1$, $L^2$ maybe a divalent linking group for bonding $Y^1$ and $Y^2$ with 1 to 3 carbon atoms and as the group satisfying the above condition, groups which have been mentioned as preferable groups for $L^1$ are preferable.

Accordingly, an alkylene group or an arylene group in $L^2$ has the same meaning as the alkylene group or an arylene group in $L^1$ and a preferable range thereof is also the same as that of the alkylene group or an arylene group in $L^1$.

$L^2$ is preferably a single bond, an alkylene group, a cycloalkylene group, or an arylene group.

In Formula (IV), it is preferable that any one of R, $Y^1$, $Y^2$, and $L^2$ is a group having at least one ring structure.

The compound represented by Formula (I) is preferable since the compound includes a water-soluble functional group and has excellent compatibility with the polyvinyl alcohol resin constituting the polarizer layer. The water-soluble functional group is a group contributive to the water solubility of the compound represented by Formula (I). Examples of the water-soluble functional group owned by the compound represented by Formula (I) include water soluble groups such as a hydroxy group, a carboxy group or a salt thereof, a sulfo group or a salt thereof, and a phosphate group or a salt thereof, and a group having an ether bond.

The molecular weight of the compound represented by Formula (I) when the compound is added to the polarizing plate protective film is preferably within a range of 350 to 1,500.

The molecular weight of the compound represented by Formula (I) when the compound is added to the adhesive layer or the polarizer layer is preferably within a range of 100 to 1.000. The C log P value of the compound represented by Formula (I) is preferably within a range of −8.0 to 12.0, more preferably within a range of −5.0 to 10.0, and even more preferably within a range of −5.0 to 8.0.

The details of the C log P value estimation program and the like are as described above.

In addition, it is preferable that the compound represented by Formula (I) having a preferable molecular weight and a preferable C log P value is selected depending on the properties of the resin to be included in the same layer with the compound represented by Formula (I), particularly, whether the resin is hydrophilic or hydrophobic.

For example, in the case of hydrophobic resins such as a cellulose ester resin, a polyester resin such as polyethylene terephthalate, a cycloolefin resin, and an acrylic resin, the molecular weight of the compound represented by Formula (I) is preferably within a range of 350 to 1,500, more preferably within a range of 400 to 1,000, and even more preferably within a range of 400 to 750. In addition, the C log P value is preferably within a range of 1.0 to 9.0, more preferably within a range of 2.0 to 9.0, and even more preferably within a range of 2.0 to 8.0.

On the other hand, in the case of hydrophilic resins such as polyvinyl alcohol or an acylated or ketalated material thereof, and water-soluble resins, the molecular weight of the compound represented by Formula (I) is preferably within a range of 100 to 1,000, more preferably within a range of 140 to 800, and even more preferably within a range of 140 to 600. In addition, the C log P value is preferably within a range of −4.0 to 1.0, more preferably within a range of −4.0 to 0.5, and even more preferably within a range of −4.0 to 0. From the viewpoint of compatibility with hydrophilic resins and water-soluble resins, the compound represented by Formula (I) is more preferably a compound having high solubility in water. Specifically, the solubility of the compound in 100 ml of water at 25° C. is preferably 0.1 g or more, more preferably 1.0 g or more, and even more preferably 1.0 g to 30.0 g.

Hereinafter, specific examples of the compound represented by Formula (I) will be shown but the present invention is not limited thereto.

0-1
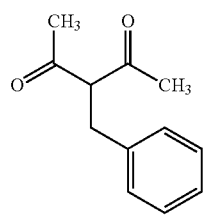

0-2
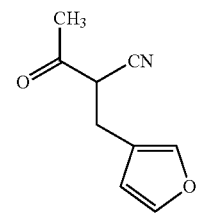

0-3
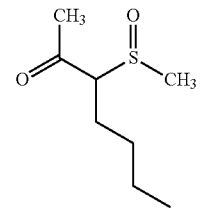

0-4
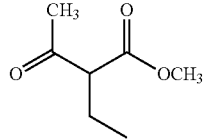

0-5
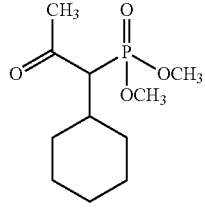

-continued 0-6
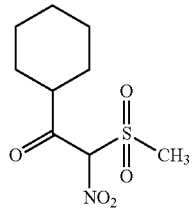

0-7
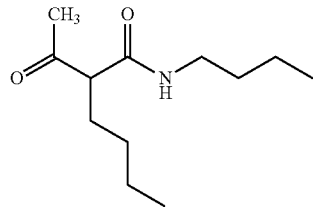

0-8
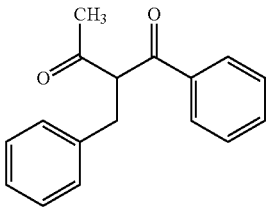

0-9
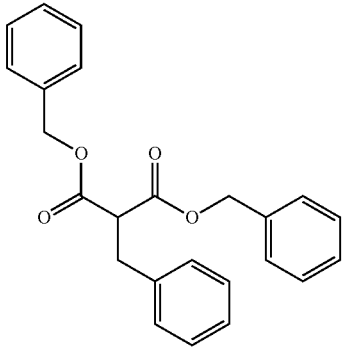

0-10
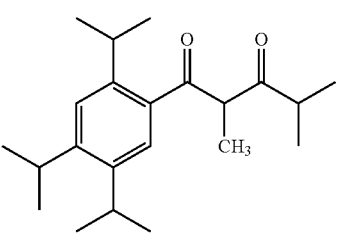

0-11
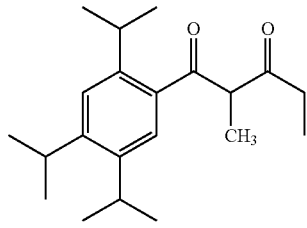

0-12
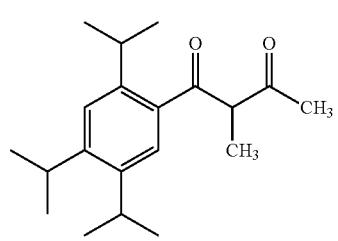
1-1
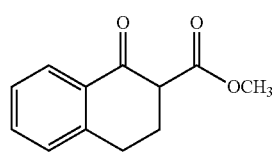
1-2
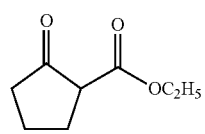
1-3
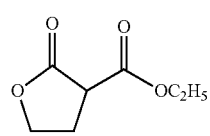
1-4
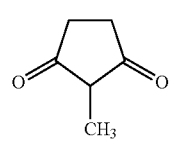
1-5
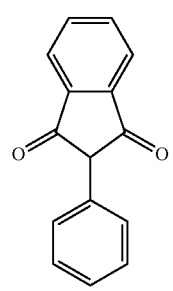
1-6
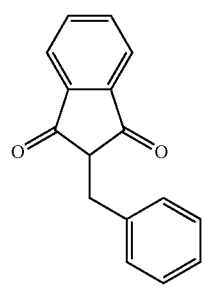
1-7
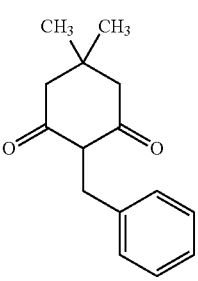
1-8
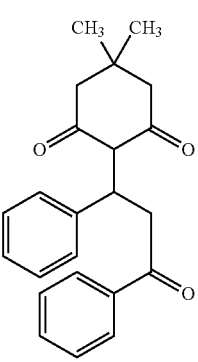
1-9
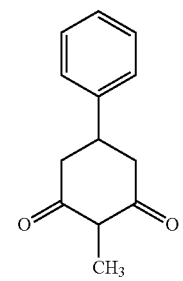
1-10
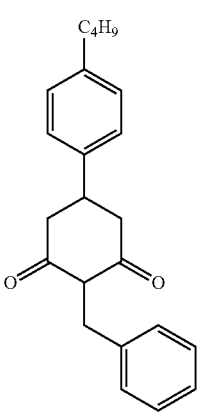

1-11
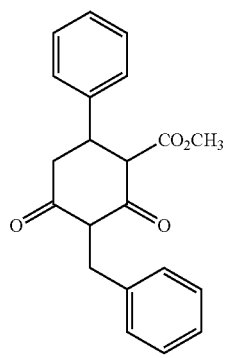
1-12
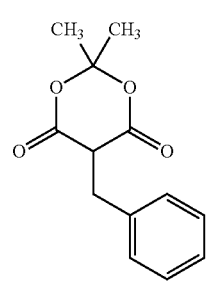
1-13
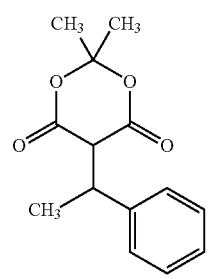
1-14
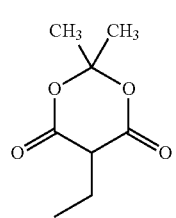
2-1
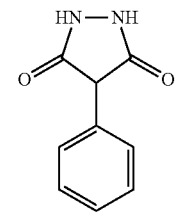
2-2
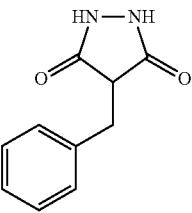
2-3
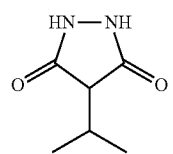
2-4
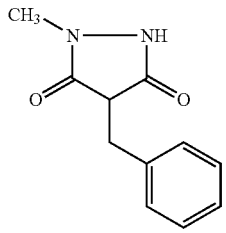
2-5
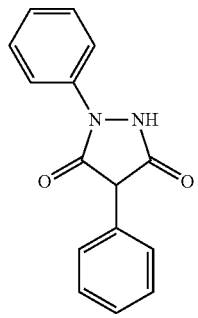
2-6
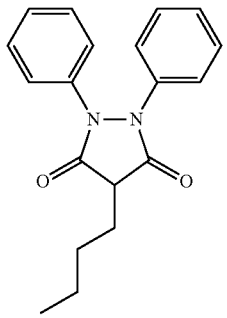
2-7
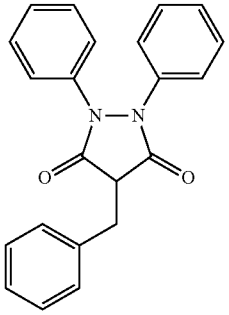

-continued 2-8

2-9

2-10

2-11

2-12

-continued 2-13

2-14

2-15

3-1

3-2

3-3 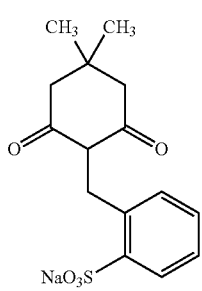

3-4 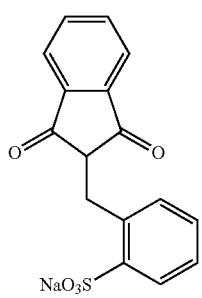

3-5 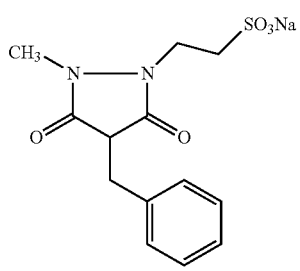

3-6 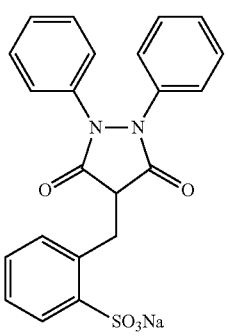

3-7 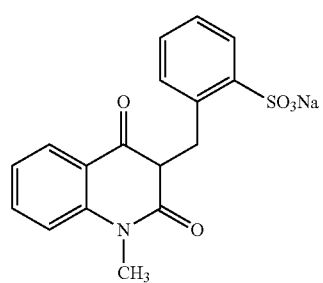

3-8 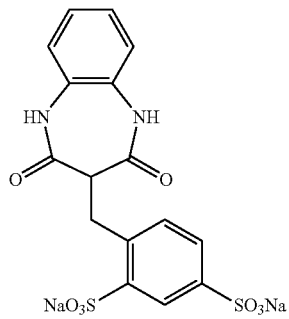

3-9 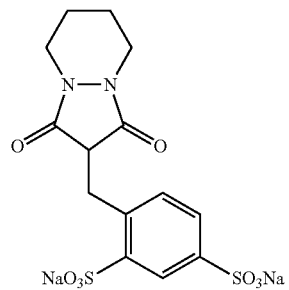

3-10 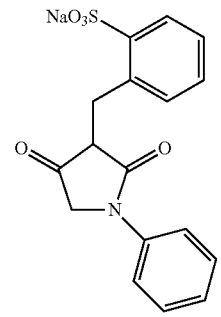

3-11 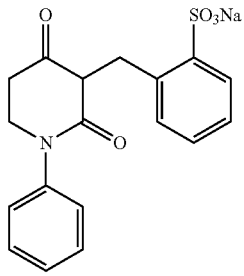

The compound represented by Formula (I) above can be synthesized by known methods. In addition, commercially available compounds can be used.

Further, specific examples of the compound exhibiting a polyiodide ion $I_5^-$ forming ability include the following compounds. Me represents a methyl group and Et represents an ethyl group below.

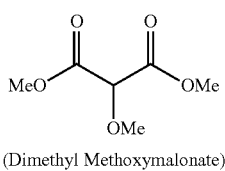

(Dimethyl Methoxymalonate)

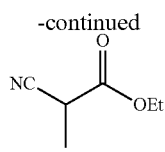

(Ethyl 2-Cyanopropionate)

Among the above exemplary compounds, there is a compound having a substituent which interacts with PVA to be included in the polarizer layer. Examples of such a substituent include substituents for forming a covalent bond, such as acetal group, a carbonyl group, a formyl group, a ketone group, a boronyl group, a boronic ester group, and a trialkoxysilyl group, and substituents for forming a hydrogen bondable group, such as fluorine. The fact that the compound exhibiting a polyiodide ion $I_5^-$ forming ability has the substituent is preferable from the viewpoint of improving the durability of the polarizing plate since the compound easily remains in the polarizer layer.

In addition, according to a layer including the compound exhibiting a polyiodide ion $I_5^-$ forming ability, the following embodiments are also preferable.

In the case in which the layer including the compound exhibiting a polyiodide ion $I_5^-$ forming ability is the polarizing plate protective film, the compound exhibiting a polyiodide ion $I_5^-$ forming ability preferably has at least one functional group which interacts with a components included in the polarizer layer, as described above, in one molecule as the substituent. It is preferable that the substituent is at least one or more groups selected from formyl groups and boronyl groups and it is more preferable that two or more substituents are included in one molecule.

In the case in which the layer including the compound exhibiting a polyiodide ion $I_5^-$ forming ability is either of or both of the polarizer layer and the adhesive layer, the compound exhibiting a polyiodide ion $I_5^-$ forming ability preferably has at least one above-described water-soluble functional group and at least one functional group which interacts with the components included in the polarizer layer in one molecule as the substituent, respectively. The compound more preferably has at least one water-soluble functional group and two or more functional groups which interact with the components included in the polarizer layer in one molecule. The substituent preferably includes at least one selected from sulfo groups as the water-soluble functional group and formyl groups and boronyl groups as the functional group which interacts with the components included in the polarizer layer.

<Layer Including Compound Exhibiting Polyiodide Ion $I_5^-$ Forming Ability>

The above-described compound exhibiting a polyiodide ion $I_5^-$ forming ability is included in any one layer of layers constituting the polarizing plate. One compound exhibiting a polyiodide ion $I_5^-$ forming ability may be used or two or more compounds exhibiting a polyiodide ion $I_5^-$ forming ability may be used in combination. In the case in which two or more compounds exhibiting a polyiodide ion $I_5^-$ forming ability are used in combination, the contents of the compounds exhibiting a polyiodide ion $I_5^-$ forming ability refer to the total amount of the compounds used in combination.

The present inventors assume that in the case in which the compound exhibiting a polyiodide ion $I_5^-$ forming ability is included in a layer other than the polarizer layer, due to temporal transition from the layer to the polarizer layer, the compound contributes to maintaining or improving polarization performance after being left to stand in a high temperature and high humidity environment.

In addition, in the case in which the compound exhibiting a polyiodide ion $I_5^-$ forming ability is included in the polarizer layer, the compound may be uniformly included in the entire polarizer layer or may be unevenly distributed in a region of the polarizer layer. As described above, it is though that one assumable mechanism is that the compound exhibiting polyiodide ion $I_5^-$ forming ability reacts with oxygen and is converted into an oxidation activating compound. It is though that the reaction between oxygen incorporated into the polarizing plate from the air and the compound more easily proceeds on the surface of the polarizer layer and a region (surface layer region) of the polarizer layer from the surface toward the thickness direction, compared to other regions. This is because the surface and the surface layer region are regions where the reaction between oxygen passing through the layer adjacent to the polarizer layer and reaching the polarizer layer and the compound more easily occurs. Accordingly, the compound exhibiting a polyiodide ion $I_5^-$ forming ability may be present in the surface or the surface layer region including the surface of the polarizer layer, which is preferable. As an example, the surface layer region may be a region with a thickness of about 1/10 to 1/3 of the thickness of the film from the surface of the polarizer layer. However, the thickness of the surface layer region is not particularly limited. In addition, a concentration distribution in which the concentration of the compound exhibiting a polyiodide ion $I_5^-$ forming ability changes continuously or stepwise, for example, from the inside to the surface may be formed in the polarizer layer.

As means for causing the compound exhibiting a polyiodide ion $I_5^-$ forming ability to be present on the surface and the surface layer region of the polarizer layer as described above, a method of coating the surface of the polarizer layer with the compound exhibiting a polyiodide ion $I_5^-$ forming ability as it is or in the form of solution can be used.

In addition, using a method of adding the compound exhibiting a polyiodide ion $I_5^-$ forming ability to the composition for fabricating each layer such as the polarizer layer and the like, a method of adding the compound exhibiting a polyiodide ion $I_5^-$ forming ability in the step of fabricating each layer, and the like, a polarizing plate including the compound exhibiting a polyiodide ion $I_5^-$ forming ability in at least one of the layers constituting the polarizing plate such as the polarizer layer and the like can be obtained.

Further, as means for causing the compound exhibiting a polyiodide ion $I_5^-$ forming ability to be present in the inside of the polarizer layer, in the case of carrying out a stretching operation in the step of fabricating each layer, a method of using a solution containing the compound exhibiting a polyiodide ion $I_5^-$ forming ability can be used.

The details relating to the above will be described below.

[Method for Producing Polarizing Plate]

A still another embodiment of the present invention relates to a method for producing the polarizing plate.

The above production method include a step of forming at least one layer including the compound exhibiting a polyiodide ion $I_5^-$ forming ability in an iodide compound-containing solution.

Hereinafter, the details of the production method will be described.

<Preparation of Polyvinyl Alcohol Film Dyed with Iodine>

A polyvinyl alcohol film may be a commercially available product or a film formed by a known method. As a method of producing a polyvinyl alcohol film, for example, a method described in paragraphs 0213 to 0237 of JP2007-86748A can be used. In addition, the polyvinyl alcohol film can be also produced referring to methods described in the specifications of JP3342516B, JP1997-328593A (JP-H09-328593A), JP2001-302817A, JP2002-144401A, and the like. The polyvinyl alcohol film means a film including a polyvinyl alcohol resin as a resin constituting the film. It is preferable that the greatest part, for example, 80% by mass or more, of the resin constituting the film is accounted for a polyvinyl alcohol resin. All of the resin constituting the film may be a polyvinyl alcohol resin. The polyvinyl alcohol resin is normally in the form of saponified polyvinyl acetate but may include, for example, components that are capable of copolymerizing with vinyl acetate such as unsaturated carboxylic acids, unsaturated sulfonic acids, olefins, and vinyl ethers. In addition, a modified polyvinyl alcohol resin containing an acetoacetyl group, a sulfonic acid group, a carboxyl group, an oxyalkylene group, or the like may be used.

The step of producing a polarizer (polarizer layer) composed of the polyvinyl alcohol film dyed with iodine may normally include a dyeing step (iodine dyeing), a crosslinking step, and a stretching step. Optionally, the production step can further include a swelling step, a cleaning step, a drying step, and the like. The above steps can be carried out in any order simultaneously or sequentially.

The stretching step can be normally carried out by uniaxial stretching. The stretching step can be carried out by, for example, a longitudinal uniaxial stretching method described in the specifications of U.S. Pat. No. 2,454,515A and the like or a tenter method descried in JP2002-86554A. The stretching ratio is preferably 2 times to 12 times and more preferably 3 times to 10 times. The stretching step can be normally carried out by wet stretching. The stretching step can be carried out after a swelling step. In addition, the stretching step can be carried out multiple times. For example, the stretched film before the dyeing step can be further stretched during the dyeing step, during the crosslinking step, or during both steps.

An iodide compound can be incorporated into a treatment liquid used for wet stretching (hereinafter, also referred to as a stretching bath). In the case in which an iodide compound is incorporated into the treatment liquid, the concentration of the iodide compound can be, for example, 0.1%6 by mass to 10% by mass and preferably 0.2% by mass to 5% by mass. The liquid temperature of the stretching bath in wet stretching is normally 25° C. or higher, preferably within a range of 30° C. to 85° C., and more preferably within a range of 50° C. to 70° C. The immersion time is normally 10 seconds to 800 seconds and preferably 30 seconds to 500 seconds.

The dyeing step (iodine dyeing) can be carried out in a gas phase or liquid phase. An example of a dyeing method that is carried out in a liquid phase is a method of immersing a polyvinyl alcohol film in an aqueous iodine-potassium iodide solution (also referred to hereinafter as a dyeing bath). The aqueous iodine-potassium iodide solution preferably has an iodine concentration of 0.1 g/l to 20 g/l, a potassium iodide concentration of 1 g/l to 200 g/l, and an iodine to potassium iodide mass ratio of 1 to 200. The dyeing time is preferably 10 seconds to 5,000 seconds, and the liquid temperature of the dyeing bath during dyeing is preferably 5° C. to 60° C. Immersion is not the only means that can be used for dyeing and any other means, such as coating with the dyeing liquid and spraying the dyeing liquid, can be used. The dyeing step can be carried out either before or after the stretching step. Further, stretching can be carried out during dyeing in the liquid phase. Since suitable swelling of the film can facilitate stretching, it is preferable to carry out dyeing in the liquid phase before the stretching step or simultaneously with stretching. In the case in which the film is stretched multiple times, the stretching step refers to the step with the greatest stretching ratio among the multiple stretching steps that are carried out.

The crosslinking step is normally carried out using a boron compound as a crosslinking agent. The sequence of the crosslinking step is not particularly limited. The crosslinking step can be carried out with the dyeing step and the stretching step. Further, the crosslinking step can be carried out one or multiple times. Examples of the boron compound include boric acid and borax. The boron compound is generally used in the form of an aqueous solution or a solution containing a solvent in the form of a mixed solvent of water and an organic solvent. Normally, an aqueous boric acid solution is employed. The concentration of boric acid in the aqueous boric acid solution is within a range of, for example, 1 part by mass to 10 parts by mass, and preferably within a range of 2 parts by mass to 7 parts by mass with respect to 100 parts by mass of the solvent. An iodide compound such as potassium iodide can be incorporated into the aqueous boric acid solution or the like (also referred to as a crosslinking bath, hereinafter). In the case in which an iodide compound is incorporated into the aqueous boric acid solution, the concentration of the iodide compound is within a range of, for example, 0.1 parts by mass to 10 parts by mass, and preferably within a range of 0.5 parts by mass to 8 parts by mass with respect to 100 parts by mass of the solvent. Carrying out a crosslinking step can crosslink and stabilize the polyvinyl alcohol, and is thus preferable from the viewpoint of enhancing polarization performance.

In the case in which the crosslinking step is carried out by immersing the polyvinyl alcohol film in a crosslinking bath, the liquid temperature of the crosslinking bath is normally 25° C. or higher, preferably within a range of 30° C. to 85° C., and more preferably within a range of 30° C. to 60° C. The immersion time is normally 5 seconds to 800 seconds, and preferably about 8 seconds to 500 seconds.

The swelling step can be carried out by immersing the polyvinyl alcohol film in the treatment liquid before or after the dyeing step. Normally, water, distilled water, or purified water is used as the treatment liquid. Water is preferably the component accounting for the greatest portion of the treatment liquid. Small amounts of an additive such as an iodide compound and a surfactant, and an organic solvent such as alcohols can be introduced into the treatment liquid. When the treatment liquid contains an iodide compound, the concentration of the iodide compound is, for example, 0.1% by mass to 10% by mass and preferably 0.2% by mass to 5% by mass.

It is preferable that the liquid temperature of the treatment liquid in the swelling step is normally adjusted to be about 20° C. to 45° C. A temperature of 25° C. to 40° C. is more preferable. The immersion time in the treatment liquid is normally within a range of 10 seconds to 300 seconds and preferably within a range of 20 seconds to 240 seconds.

A cleaning step can be carried out using a potassium iodide solution as a cleaning liquid. The concentration of the potassium iodide in the potassium iodide solution is normally within a range of 0.5% by mass to 10% by mass, preferably within a range of 0.5% by mass to 8% by mass, and more preferably within a range of 1% by mass to 6% by mass.

The liquid temperature of the cleaning liquid is normally 15° C. to 60° C. and preferably 25° C. to 40° C. The immersion time in the cleaning liquid is normally within a range of 1 second to 120 seconds and preferably within a range of 3 seconds to 90 seconds.

The cleaning step can be carried out by washing with water. Washing with water is normally carried out by immersing the polyvinyl alcohol film in pure water such as ion exchange water or distilled water. The liquid temperature of the water that is used for washing with water is normally within a range of 5° C. to 50° C., preferably within a range of 10° C. to 45° C., and more preferably within a range of 15° C. to 40° C. The immersion time in water is normally 5 seconds to 300 seconds and preferably about 10 seconds to 240 seconds.

After each of the above steps is performed, a drying step can be finally performed. The drying step can be carried out, for example, for about 30 seconds to 60 minutes in the atmosphere at a temperature of 30° C. to 100° C.

Paragraphs 0039 to 0050 of JP2011-237580A can be referred to with regard to the step of producing the polarizer.

<Step of Forming at Least One Layer Including Compound Exhibiting Polyiodide Ion $I_5^-$ Forming Ability>

The above-described polarizing plate has at least one layer including the compound exhibiting a polyiodide ion $I_5^-$ forming ability. In the embodiment, the layer including the compound is a polarizer layer, in another embodiment, the layer including the compound is a polarizing plate protective layer, and in still another embodiment, the layer including the compound is an adhesive layer.

(Method for Forming Polarizer Layer Including Compound Exhibiting Polyiodide Ion $I_5^-$ Forming Ability)

As an example of the method for incorporating the compound into the polarizer layer, a method of adding the compound to the film forming composition used to form the polyvinyl alcohol film can be used.

Another example thereof is a method of applying the compound to the polyvinyl alcohol film at least before the dyeing step, during the dyeing step, or after the dyeing step. Herein, the term "applying" means bringing the polyvinyl alcohol film into contact with the compound by any means such as coating, immersion, or spraying, and preferably refers to adsorption or permeation. To that end, for example, the method of adding the compound to a liquid phase such as the above-described stretching bath, dyeing bath, cross-linking bath, treatment liquid, or cleaning liquid can be used. A still another example is a method of coating at least one surface of the polyvinyl alcohol film after iodine dyeing with a solution including the compound. The application by coating described above is preferable as a method of obtaining a polarizer layer in which the compound is present on the surface or in a surface layer region including the surface.

One of the above-describe methods may be carried out or two or more methods may be carried out in combination. In the case of using any of these method, it is preferable to set the production conditions such that a desired amount of the compound exhibiting a polyiodide ion $I_5^-$ forming ability is incorporated into the polarizer layer. In consideration of the compatibility of the compound and the polyvinyl alcohol resin, the content of the compound exhibiting a polyiodide ion $I_5^-$ forming ability in the polarizer layer is preferably within a range of 0.01 parts by mass to 30 parts by mass, more preferably within a range of 0.01 parts by mass to 10 parts by mass, and even more preferably within a range of 1 part by mass to 10 parts by mass with respect to 100 parts by mass of the polyvinyl alcohol resin.

In the case of using the method of coating at least one surface of the polyvinyl alcohol film after iodine dyeing with the solution including the compound, the solvent in the coating liquid is not particularly limited. One or a mixture of two or more solvents in any ratio can be used. The solvent is preferably a solvent in which the compound exhibiting a polyiodide ion $I_5^-$ forming ability exhibits high solubility and may be appropriately selected based on the compound exhibiting a polyiodide ion $I_5^-$ forming ability. Examples thereof include methyl ethyl ketone, methylene chloride, methanol, methyl acetate, and tetrahydrofuran (THF). However, there is no limitation to these solvents.

In addition, the concentration of the compound exhibiting a polyiodide ion $I_5^-$ forming ability in the coating liquid is, for example, about 0.0005 mol/L to 50 mol/L. The coating amount of coating liquid is, for example, about 1 ml/m$^2$ to 60 ml/m$^2$.

(Method for Forming Adhesive Layer Including Compound Exhibiting Polyiodide Ion $I_2^-$ Forming Ability)

In the polarizing plate, an adhesive layer is sometimes provided as a layer adjacent to the polarizer layer to enhance adhesiveness between the polarizer layer and other layers, or adhesiveness between the polarizing plate and other members. In this case, it is possible to incorporate the compound exhibiting a polyiodide ion $I_5^-$ forming ability into the adhesive layer. In consideration of compatibility with the resin, the content of the compound exhibiting a polyiodide ion $I_5^-$ forming ability in the adhesive layer is preferably within a range of 0.01 parts by mass to 30 parts by mass, more preferably within a range of 0.01 parts by mass to 10 parts by mass, and even more preferably within a range of 1 part by mass to 10 parts by mass with respect to 100 parts by mass of the resin constituting the adhesive layer.

The resin used for the adhesive layer is not particularly limited. All resins known to be present in adhesives can be used without restriction. An adhesive having viscosity (a pressure sensitive adhesive) or an adhesive that exhibits adhesiveness when dried or by means of a reaction can be used. In the present invention, the term "adhesive" means both adhesives and pressure sensitive adhesives.

The adhesive layer normally includes a resin as the component accounting for the greatest portion (the main component). The resin normally accounts for, for example, 30% by mass or more and 90% by mass or less, of the adhesive layer. It preferably accounts for 70% by mass or more of the adhesive layer. The resin can be a mixture of multiple resins. Examples of mixtures include mixtures in which the main skeleton structure is composed almost entirely of the same component, such as mixtures of polymers in which some of the resin is modified, and resins synthesized by reaction with a different monomer. In the case in which the resin is a mixture, it means that the total amount of the mixture is within the above-mentioned range.

The adhesive layer can be formed, for example, by coating at least one surface of the polarizer layer or any other layer provided (such as a polarizing plate protective film) with a coating liquid containing an adhesive at a predetermined ratio, and drying the coating liquid. The coating liquid can be prepared by any suitable method. By way of example, a coating liquid in the form of a commercially available solution or dispersion can be used, a solvent can be further added to a commercially available solution or dispersion for use, or the solid components can be dissolved or dispersed in any of various solvents for use.

As the adhesive, an adhesive having any appropriate properties, form, or adhesive mechanism can be employed based on the objective. Specific examples of adhesives include water-soluble adhesives, ultraviolet curable adhesives, emulsion-type adhesives, latex-type adhesives, mastic adhesives, multiple layer adhesives, paste adhesives, foamtype adhesives, supported film adhesives, thermoplastic adhesives, heat-fused adhesives, thermally solidifying adhesives, hot melt adhesives, heat-activated adhesives, heat seal adhesives, thermosetting adhesives, contact adhesives, pressure sensitive adhesives, polymerizing adhesives, solvent-type adhesives, and solvent activated adhesives. Water-soluble adhesives and ultraviolet curable adhesives are preferable. From the viewpoint of affinity with the polyvinyl alcohol resin, the use of a water-soluble adhesive or ultraviolet curable adhesive is preferable in an adhesive layer that is adjacent to the polarizer layer.

For example, the water-soluble adhesive may contain at least either a water-soluble natural polymer or synthetic polymer. Examples of the natural polymer include proteins and starches. Examples of the synthetic polymer include resol resins, urea resins, melamine resins, polyethylene oxide, polyacrylamide, polyvinyl pyrrolidone, acrylic esters, methacrylic esters, and polyvinyl alcohol resins. Among these, water-soluble adhesives containing polyvinyl alcohol resins are preferably used. Because water-soluble adhesives containing polyvinyl alcohol resins has excellent adhesiveness to polyvinyl alcohol films (the polarizer layer), the adhesives are preferably used for adhesive layers adjacent to the polarizer layer.

In the case in which an adhesive layer formed of a water-soluble adhesive containing a polyvinyl alcohol resin is adjacent to the polarizer layer, there are cases in which a state is achieved such that the adhesive layer and the polarizer layer can be considered to be a single, integrated layer.

The adhesive layer can include a metal compound and preferably includes a metal compound colloid. For details, paragraphs 0079 to 0083 of JP2012-014148A can be referred to.

Examples of other additives include various additives normally used for the adhesive layers of polarizing plates, such as chain transfer agents, sensitizers, viscosity imparting agents, thermoplastic resins, fillers, flow control agents, plasticizers, and antifoaming agents. These can be used singly or in combinations of two or more. In the case of blending additives therein, the amount of the additives added is preferably 40% by mass or less and more preferably 0.1% by mass or more and 30% by mass or less with respect to the amount of the resin (adhesive).

The adhesive layer can include a crosslinking agent such as boric acid. It is considered that by incorporating boric acid into the adhesive layer, adhesiveness can be enhanced between the polarizer layer and the adhesive layer and between layers of optionally provided polarizing plate protective films and adhesive layers through the formation of a crosslinked structure (boric acid crosslinking) in the form of bonds with the hydroxyl groups in the resin constituting the adhesive layer. For example, because the polarizing plate protective film is normally subjected to a saponification treatment, the film has hydroxyl groups on the surface thereof. A polarizing plate protective film formed of cellulose ester resin will have numerous hydroxyl groups on the surface due to the saponification treatment. A polarizing plate protective film formed of a polyester resin such as polyethylene terephthalate or a cycloolefin resin can also have hydroxyl groups on the surface due to a surface treatment such as saponification. By incorporating the compounds exhibiting a polyiodide ion $I_5^-$ forming ability, particularly the compound represented by Formula (I) among the compounds, and boric acid, into an adhesive layer that is adjacent to a polarizing plate protective film that is imparted with hydroxyl groups on the surface by such a saponification treatment, boric acid crosslinking can be promoted between the adhesive layer and the polarizer layer, and between the adhesive layer and the polarizing plate protective film. Thus, the adhesiveness between the polarizer layer and the polarizing plate protective film can be further improved.

In the case in which boric acid is blended in the adhesive layer including the compound exhibiting a polyiodide ion $I_5^-$ forming ability, the amount thereof is preferably 0.1 parts by mass or more and 10,000 parts by mass or less, and more preferably 1 part by mass or more and 1,000 parts by mass or less with respect to 100 parts by mass of the compound exhibiting a polyiodide ion $I_5^-$ forming ability. It is more preferable that the adhesive layer including the crosslinking agent and the compound exhibiting a polyiodide ion $I_5^-$ forming ability is provided as a layer adjacent to the layer formed of a polyvinyl alcohol resin or a cellulose ester resin, which is a resin having numerous hydroxyl groups.

The thickness of the adhesive layer can be appropriately set. Specifically, in the case of using a pressure sensitive adhesive in the adhesive layer, the thickness of the adhesive layer is preferably within a range of 0.1 μm to 50 μm, more preferably within a range of 0.5 μm to 20 μm, even more preferably within a range of 1 μm to 15 μm, and particularly preferably within a range of 5 μm to 10 μm. On the other hand, in the case of using an adhesive in the adhesive layer, the thickness of the pressure sensitive adhesive layer is preferably within a range of 10 nm to 500 nm, more preferably within a range of 10 nm to 400 nm, and even more preferably within a range of 20 nm to 350 nm. The adhesive layer can be formed by applying an adhesive or a pressure sensitive adhesive to the surface of the polarizer layer or an optionally provided polarizing plate protective film by a known coating method such as spin coating, roll coating, flow coating, dip coating, or bar coating.

The adhesive layer may be provided directly or indirectly through other layers such as primer layers (also referred to as easy adhesive layers) on one or both of the surfaces of the polarizer layer based on the mode used. The adhesive layer can also be formed as a layer that is not adjacent to the polarizer layer. In that case, the compound exhibiting a polyiodide ion $I_5^-$ forming ability may be included in the adhesive layer. In another embodiment, the compound exhibiting a polyiodide ion $I_5^-$ forming ability can be included in the adhesive layer adjacent to the polarizer layer.

(Method for Forming Polarizing Plate Protective Film Including Compound Exhibiting Polyiodide Ion $I_5^-$ Forming Ability)

The polarizing plate can optionally have one or more polarizing plate protective films. The compound exhibiting a polyiodide ion $I_5^-$ forming ability may be included in the polarizing plate protective film.

In consideration of compatibility with the resin, the content of the compound exhibiting a polyiodide ion $I_5^-$ forming ability in the polarizing plate protective film preferably within a range of 0.01 parts by mass to 30 parts by mass, more preferably within a range of 0.01 parts by mass to 10 parts by mass, and even more preferably within a range of 1.0 part by mass to 10 parts by mass with respect to 100 parts by mass of the resin constituting the polarizing plate protective film.

Examples of the raw material for the polarizing plate protective film include cellulose ester resins, polycarbonate resins, polyester carbonate resins, polyarylate resins, polysulfone resins, polyether sulfone resins, and cycloolefin resins such as norbornene resins, polystyrene resins, polacrylate resins, polymethacrylate resins, polyester resins, and imide resins such as olefin maleimide resins, or glutarimide resins. These can be used singly or as a mixture thereof. Among these resins, cellulose ester resins, cycloolefin resins, polystyrene resins, imide resins, and polymethacrylate resins are preferably used due to their birefringence caused by molecular alignment and their relatively low photo-elastic coefficients. The resin can account for 5% by mass to 99% by mass, preferably accounts for 20% by mass to 99% by mass, and more preferably accounts for 50% by mass to 95% by mass of the polarizing plate protective film.

A method for producing the film by incorporating the compound exhibiting a polyiodide ion $I_5^-$ forming ability into the composition for producing the polarizing plate protective film (dope), a method for adsorbing the compound to the surface of the film or causing the compound to permeate through a surface layer region by the above coating method, or the like can be used to incorporate the compound exhibiting a polyiodide ion $I_5^-$ forming ability into the polarizing plate protective film. The content of the compound exhibiting a polyiodide ion $I_5^-$ forming ability in the composition for producing the polarizing plate protective film is preferably 0.01 parts by mass to 30 parts by mass, more preferably 0.01 parts by mass to 10 parts by mass, and even more preferably 1.0 part by mass to 10 parts by mass with respect to 100 parts by mass of the resin constituting the polarizing plate protective film.

With the exception that the compound exhibiting a polyiodide ion $I_5^-$ forming ability is added to the composition for producing the polarizing plate protective film, the polarizing plate protective film including the compound exhibiting a polyiodide ion $I_5^-$ forming ability can be produced by any method known as a method for producing a polarizing plate protective film without limitation. For example, a polarizing plate protective film including the compound exhibiting a polyiodide ion $I_5^-$ forming ability can be produced by a melt film production method or a solution film production method (solvent casting method).

JP2005-104149A and Paragraphs 0034 to 0040 of JP2012-014148A can be referred to with regard to the resin constituting the polarizing plate protective film, additives, and production methods thereof.

Commercially available and known polarizing plate protective films can be used as polarizing plate protective films not including the compound exhibiting a polyiodide ion $I_5^-$ forming ability. Examples thereof include commercially available cellulose triacetate films (FUJITAC TD80UF, produced by Fujifilm Corporation), the polymer resin film containing an alicyclic structure described in JP2006-58322A, and the acrylic resin film described in JP2009-122644A.

The polarizing plate protective film can be provided directly or indirectly on the surface of the polarizer layer through one or more other layers such as an adhesive layer. In addition, the polarizing plate protective film can be provided on one surface or both surfaces of the polarizer layer.

In the case in which the polarizing plate according to the embodiment of the present invention includes two polarizing plate protective films, the films may be identical to or different from each other. The thickness of the polarizing plate protective film is normally 5 μm to 300 μm, preferably 10 μm to 200 μm, even more preferably 15 μm to 100 μm, and particularly preferably 15 μm to 60 μm.

<Other Layers that can be Provided in Polarizing Plate>

The polarizing plate according to the embodiment of the present invention can have functional layers such as a phase difference layer, an antireflection layer, a hard coat layer, a forward-scattering layer, and an antiglare layer to improve the visibility and mechanical properties of the display. Such functional layers may take the form of laminations on a polarizing plate protective layer or the form of functionalized polarizing plates formed by combining the functional layers with a film having the functional layers, or an optical film such as an optical compensation film or brightness enhancement film. Regarding function-imparting antireflection films, brightness enhancement films, other functional optical films, hard coat layers, forward-scattering layers, and antiglare layers, paragraphs 0257 to 0276 of JP2007-86748A can be referred to.

The polarizing plate according to the embodiment of the present invention can also be employed as a functional optical film further provided with functional layers such as a gas barrier layer, a lubricating layer, an antistatic layer, an undercoat layer, and a protective layer. These functional layers can be provided on either the polarizer layer side, the opposite side of the polarizer layer side (the side closer to air side), or both sides for use. JP2005-104149A, paragraphs 0139 to 0160 of JP2012-014148A, and the like can be referred to with regard to functions that can be combined into these polarizing plate protective films.

As one embodiment of the polarizing plate, a polarizing plate not including a compound exhibiting a polyiodide ion $I_5^-$ reducing ability in the iodide compound and the iodine compound-containing solution in the polarizer layer can be used. Herein, the polyiodide ion $I_5^-$ reducing ability exhibited in the iodide compound and the iodine-containing solution is a value measured by the following manner. The operation described below is carried out in the air at room temperature (at 25° C. and a relative humidity of 40% RH) unless otherwise specified. Specific examples of such a compound include compounds selected from the group consisting of ascorbic acid, erythorbic acid, chlorogenic acid, citric acid, rosemarinic acid, thiosulfuric acid, sulfurous acid, and salts thereof. In addition, examples of salts include alkali metal salts such as sodium salts and potassium salts. Herein, the term "not including" means that a compound is not used as the component for forming the polarizer layer. As a result of ion transition from layers other than the polarizer layer after the polarizing plate is fabricated, the compound being included in the polarizer layer is not included in the range of "not including". Further, in the following description, a method of using potassium iodide as the iodide compound will be described as an example, but for example, iodide compounds described above may be used as the iodide compound.

(1) Potassium iodide (KI) and iodine $I_2$ are added to a mixed solvent (water:methanol=4:6 (volumetric ratio)) and the mixture is thoroughly stirred to prepare a $KI/I_2$ solution (KI concentration: 96.4 mmol/L, $I_2$ concentration: 0.63 mmol/L).

Some of the $KI/I_2$ solution that has been prepared is used to prepare a solution of the target compound below, and the remainder is used as the following reference solution.

(2) The target compound, the ability of which to reduce polyiodide ions $I_5^-$ in the $KI/I_2$ solution is being determined, is added to the $KI/I_2$ solution such that the concentration becomes 0.63 mmol/L and the mixture is thoroughly stirred and mixed. A beaker containing the target compound solution thus prepared and a beaker containing thee reference solution are left to stand at room temperature for 48 hours without temperature and humidity control. The standing time is measured while setting the time of adding the target compound to the $KI/I_2$ solution as a start time.

(3) Subsequently, some of the target compound solution is collected from the beaker and diluted with a mixed solvent (water:methanol=4:6 (volumetric ratio)) by 10 times. Then, the cell having a width (distance traversed by the passing light) of 1 cm is used to measure the light absorbance of the target compound solution at a wavelength of 355 nm with a spectrophotometer.

(4) The light absorbance of the reference solution is measured in the same manner as for the target compound solution.

(5) In the case in which the light absorbance ($A_{sample}$) of the target compound solution at a wavelength of 355 nm is lower than the light absorbance ($A_{ref.}$) of the reference solution at a wavelength of 355 nm, that is, $A_{sample} < A_{ref.}$, the target compound is determined as a compound exhibiting a polyiodide ion $I_5^-$ reducing ability in the iodide compound and the iodine-containing solution.

In addition, regarding the target compound solution whose light absorbance ($A_{sample}$) at a wavelength of 355 nm obtained by the above measurement is not lower than the light absorbance ($A_{ref.}$) of the reference solution at a wavelength of 355 nm, oxygen remaining in the solution is removed from the target compound solution by allowing an inert gas to pass through the solution and then the light absorbance is measured again. In the case in which the light absorbance ($A_{sample}$) obtained from the result is lower than the light absorbance ($A_{ref.}$) of the reference solution at a wavelength of 355 nm, the target compound is determined as a compound exhibiting a polyiodide ion $I_5^-$ reducing ability in the iodide compound and the iodine-containing solution. The passing of the inert gas can be carried out by bubbling a nitrogen gas for, for example, 10 minutes to 20 minutes. After bubbling, while the solution is left to stand at room temperature for 48 hours without temperature control, the solution is sealed and stored not to be in contact with oxygen in the air.

However, in the case in which the target compound solution immediately after the solution is prepared has an absorption at a wavelength of 355 nm, a value obtained by subtracting the light absorbance of the target compound solution at a wavelength of 355 nm from the light absorbance obtained by the above measurement before being left to stand at room temperature, for example, within 10 minutes from the start time is used for determination of whether or not the target compound exhibits a polyiodide ion $I_5^-$ reducing ability.

As described above, the light absorbance measurement by a spectrophotometer is carried out by the comparison between the measurement result for the target solution to be measured and the measurement result for a blank solution. The measurement of the blank solution (blank test) is carried out using the same cell as the cell used to measure the light absorbance of the target compound solution in order to eliminate or reduce the effect of the cell. The mixed solvent that is used to prepare the target compound solution (not containing the target compound, the iodide compound, and iodine) is used as the blank solution.

<Shape of Polarizing Plate>

The shape of the polarizing plate includes not only polarizing plates in the form of pieces of film of a size that can be cut to permit combination with liquid crystal display devices as is, but also polarizing plates in a form that is continuously produced, fabricated in an elongated shape, and wound up into rolls (forms such as roll lengths of 2,500 m or more or 3,900 m or more). The width of the polarizing plate is preferably 1,000 mm or more for use as a polarizing plate for a large-screen liquid crystal display device.

<Performance of Polarizing Plate>

In the polarizing plate according to the embodiment of the present invention, at least one of the layers includes the compound exhibiting a polyiodide ion $I_5^-$ forming ability in the iodide compound-containing solution. Thus, it is possible to prevent polarization performance from deteriorating in a high temperature and high humidity environment, and in one embodiment, the polarization performance can be improved.

The performance and the durability of the polarizing plate can be evaluated by measuring variation in the orthogonal transmittance of the polarizing plate in a specific environment. A specific evaluation method will be described below.

(Orthogonal Transmittance CT)

The orthogonal transmittance CT at a wavelength of 410 nm is preferably CT≤2.0, more preferably CT≤1.3, even more preferably CT≤0.6 (the unit being % in all of these cases), and still even more preferably CT≤0.05. As the orthogonal transmittance CT at a wavelength of 410 nm lowers, less light leakage occurs in the vicinity of a wavelength of 410 nm. In contrast, as the orthogonal transmittance at a wavelength of 410 nm becomes higher, more light leakage occurs in the vicinity of a wavelength of 410 nm and the bluish tint in the black display state of the display is exhibited. Accordingly, from the viewpoint of color reproducibility, it is preferable that the orthogonal transmittance at a wavelength of 410 becomes lower. The low orthogonal transmittance means that the polarization performance is good. The orthogonal transmittance can be measured by, for example, measuring devices used in examples described later.

(Variation Amount of Orthogonal Transmittance)

As an index for evaluation for durability in a high temperature and high humidity environment, a variation amount of the orthogonal transmittance before and after the polarizing plate is left to stand in a high temperature and high humidity environment for a predetermined period of time can be used. For example, when the polarizing plate is left to stand in an environment of a temperature of 60° C. and a relative humidity of 90% for 500 hours, a variation amount of the orthogonal transmittance at a wavelength of 410 nm [variation amount=(orthogonal transmittance (%) after being left)−(orthogonal transmittance (%) before being left)] is preferably 0.03% or less and the variation amount is more preferably zero or less. Further, it is even more preferable that the variation amount has a negative value, that is, the orthogonal transmittance after being left is smaller than the orthogonal transmittance before being left. This means that the polarization performance is improved while the polarizing plate is left to stand in a high temperature and high humidity environment.

In one embodiment of the present invention, it is possible to improve polarization performance as well as to prevent the polarization performance from deteriorating in a high temperature and high humidity environment.

The above-described orthogonal transmittance adopts an average value of 10 measurement values. In addition, the variation amount of the orthogonal transmittance is obtained as a difference of the average value obtained by measuring the orthogonal transmittance 10 times before being left and after being left, respectively.

(Other Properties)

The preferable optical properties owned by the polarizing plate are described in paragraphs 0238 to 0255 of JP2007-086748A. The polarizing plate according to the embodiment of the present invention preferably satisfies these properties.

<Step of Producing Polarizing Plate>

The polarizing plate can be produced by bonding each layer such as the polarizer layer, through adhesive layers as needed.

When the polarizer layer and the polarizing plate protective film are bonded to each other, the bonding is preferably carried out such that the transmission axis of the polarizer layer and the slow axis of the polarizing plate protective film are parallel, perpendicular, or at 45°.

The parallel, perpendicular, or 45° includes the scope of error that is allowable in the field of art to which the present invention belongs. For example, it means that the error is within a range of ±less than 10° from the precise angle as related to parallel and perpendicular. The error with respect to the precise angle is preferably 5° or less and more preferably 3° or less. The term "parallel" as related to the transmission axis of the polarizer layer and the slow axis of the polarizing plate protective film preferably means that the angle formed by the direction of the main refractive index nx of the polarizing plate protective film and the direction of the transmission axis of the polarizing plate is preferably 5° or less, more preferably 1° or less, and even more preferably 0.5° or less. The error of 1° or less is preferably in that the polarization performance of the polarizing plate does not easily drop in a crossed-nicols state and light leakage can be reduced effectively.

In addition to each layer described above, examples of constituent members of the polarizing plate include members such as a transparent substrate of a display device such as a liquid crystal cell and an organic EL panel, and a front plate disposed to protect the display device.

[Liquid Crystal Display Device]

Next, the liquid crystal display device according to the embodiment of the present invention will be described.

FIG. 1 is an example of a schematic view showing an example of a liquid crystal display device according to one embodiment of the present invention.

In FIG. 1, a liquid crystal display device 10 is composed of a liquid crystal cell having a liquid crystal layer 5, and a liquid crystal cell upper electrode substrate 3 and a liquid crystal cell lower electrode substrate 6 disposed above and below the liquid crystal layer, respectively, and an upper polarizing plate 1 and a lower polarizing plate 8, disposed on both sides of the liquid crystal cell. The lamination is such that an absorption axis 2 of the upper polarizing plate 1 of the liquid crystal cell is perpendicular to an absorption axis 9 of the lower polarizing plate 8. A color filter can be disposed between the liquid crystal cell and each of the polarizing plates. In the case in which the liquid crystal display device 10 of a transmitting type is used, a hot or cold cathode fluorescent tube or a backlight with a light source in the form of a light emitting diode, a field emission element, or an electroluminescent element is disposed in the rear. In FIG. 1, reference numbers 4 and 7 indicate an alignment control direction.

The upper polarizing plate 1 and the lower polarizing plate 8 are often used in a laminated configuration formed of polarizers, each of which is sandwiched between two polarizing plate protective films. In the liquid crystal display device 10, optical compensation films can be used as the protective films on the liquid crystal cell side of the polarizing plates. Alternatively, without protective films, the polarizer layers and electrode substrates 3 and 6 may be directly bonded with adhesive layers.

The liquid crystal display device 10 can be of the image direct-view, image projection, or light modulation type. The driving mode of the liquid crystal layer 5 can be any known mode such as TN mode, VA mode, transverse electric field mode including IPS mode, OCB mode, or ECB mode.

Although not shown, as another configuration, the polarizing plate according to the embodiment of the present invention can be used as a part of a round polarizing plate disposed to prevent reflection of a reflective type or semi-transparent type liquid crystal display device or a self-emitting element such as organic EL or the like.

EXAMPLES

Examples are given below to more specifically describe the present invention. Suitable modification of the materials, reagents, amounts and ratios of materials, operations, and the like indicated in Examples below is possible without departing from the spirit of the present invention. Accordingly, the scope of the present invention is not limited to the specific examples given below.

In the examples, the following Compounds 1-1 to 1-6 were used.

Compound 1-1

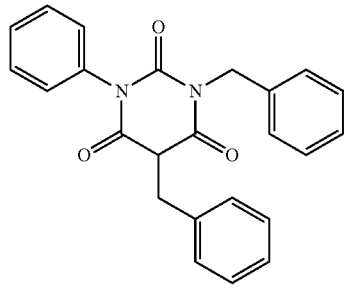

(Exemplary Compound A-4)

Compound 1-2

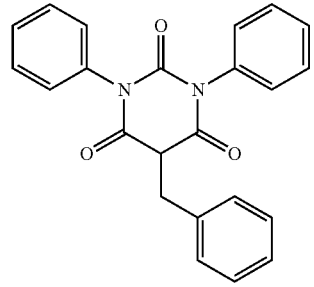

(Exemplary Compound A-3)

Compound 1-3

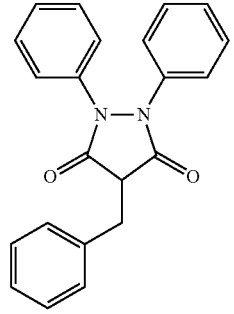

(Exemplary Compound 2-7)

-continued

Compound 1-4

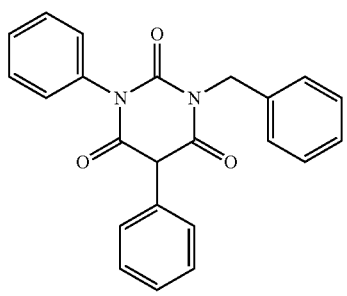

(Exemplary Compound A-2)

Compound 1-5

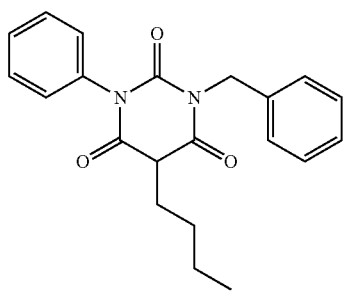

(Exemplary Compound A-46)

Compound 1-6

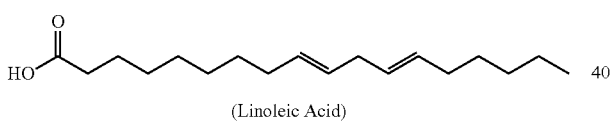

(Linoleic Acid)

Compound 1-7

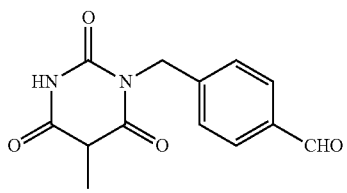

(Exemplary Compound A-84)

Compound 1-8

(Exemplary Compound A-91)

-continued

Compound 1-9

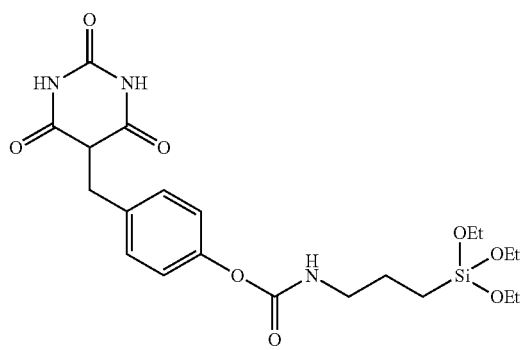

(Exemplary Compound A-95)

Compound 1-10

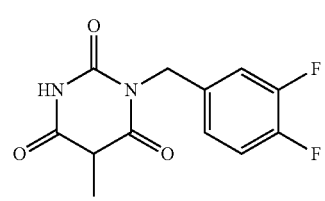

(Exemplary Compound A-98)

Compound 1-11

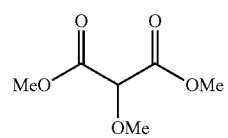

(Dimethyl Methoxymalonate)

Compound 1-12

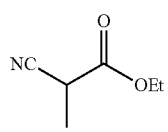

(Ethyl 2-Cyanopropionate)

In Comparative Examples 2 and 3, the following Comparative Compounds were used.

Comparative Compound 2-1

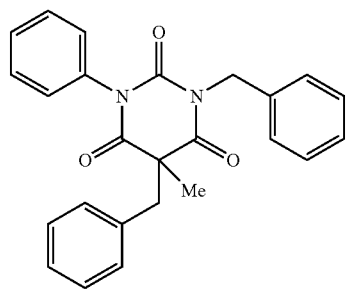

-continued

Comparative Compound 2-2

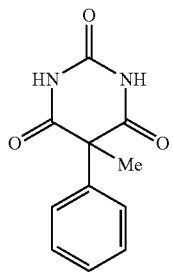

1. Synthesis Example of Compound

Synthesis of Compound 1-1 (Exemplary Compound A-4)

Exemplary Compound A-4 was synthesized according to the following scheme.

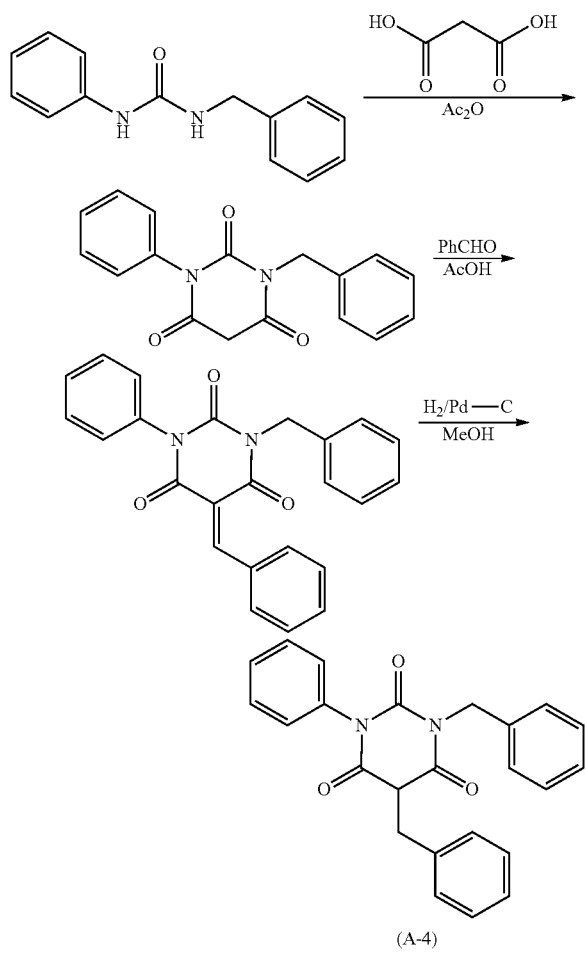

(A-4)

1) Synthesis of Intermediate N-Benzyl-N'-Phenylurea

In a 5 L glass flask equipped with a thermometer, a reflux condenser, and a stirrer, 321 g of benzylamine and 2 L of acetonitrile were put, the content was cooled in a water bath, 358 g of phenyl isocyanate was added dropwise thereto under stirring at a rate at which the inner temperature of the reaction solution reached 40° C. or lower and the content was kept under stirring for 2 hours. Then, 2 L of water was added thereto. Deposited crystals were collected by filtration under suction, and washed with 1 L of water 3 times. The obtained crystal was dried under reduced pressure at 80° C. to obtain 610 g of an intermediate N-benzyl-N'-phenylurea.

2) Synthesis of Intermediate 1-Benzyl-3-Phenylbarbituric Acid

In a 300 ml glass flask equipped with a thermometer, a reflux condenser, and a stirrer, 5.0 g of N-benzyl-N'-phenylurea synthesized in 1) above, 2.5 g of malonic acid, 20 mL of toluene, 5.6 g of acetic anhydride were put, the content was heated under stirring so as to adjust the inner temperature to 80° C. and was continued to be stirred at 80° C. for 3 hours. Then, the content was cooled to 50° C. and 15 mL of water was added thereto for liquid separation. Then, the aqueous phase was discarded. The organic layer was kept under stirring at room temperature, and 5 ml of isopropanol was added dropwise thereto. Further, this solution was stirred at 10° C. or lower for 0.5 hours and then filtered under suction to collect deposited crystals, and the crystals were washed with cooled isopropanol. Then, the crystals were dried to obtain 4.6 g of an intermediate 1-benzyl-3-phenylbarbituric acid.

3) Synthesis of Intermediate 1-Benzyl-5-Benzylidene-3-Phenylbarbituric Acid

In a 300 ml glass flask equipped with a thermometer, a reflux condenser, and a stirrer, 4.0 g of 1-benzyl-3-phenylbarbituric acid synthesized in 2) above, 1.6 g of benzaldehyde, and 40 mL of acetic acid were put, a drop of sulfuric acid was added the content, the flask was heated to adjust the inner temperature to 100° C. under stirring, and the content was continued to be stirred at 100° C. for 3 hours. Then, content was cooled to 50° C. and a mixed solution of 39 mL of isopropanol and 17 mL of water was added thereto. The content was stirred at 10° C. or lower for 1 hour and then filtered under suction to collect deposited crystals, and the crystals were washed with methanol to obtain 3.9 g of an intermediate 1-benzyl-5-benzylidene-3-phenylbarbituric acid.

The structure of the obtained compound was confirmed by $^1$H-NMR spectrum.

$^1$H-NMR (300 MHz, CDCl$_3$), δ: 8.70 (s, 1H), 8.10 (d, 2H), 7.58-7.20 (m, 15H), 5.20 (s, 2H)

4) Synthesis of Exemplary Compound A-4

In a 50 ml autoclave, 3.5 g of 1-benzyl-5-benzylidene-3-phenylbarbituric acid synthesized in 3) above, and 8 mL of methanol were put, 0.1 g of Pd—C (10%) was added thereto, and under stirring, the autoclave was filled with H$_2$, heated so as to adjust the inner temperature to 50° C. The content was continued to be stirred at 50° C. for 3 hours. Then, Pd—C was removed by filtration, and the filtrate was cooled to 5° C. Further, 4 mL of water was added thereto, and the content was stirred at 5° C. for 1 hour and filtered under suction to collect deposited crystals. The crystals were washed with a mixed solution of methanol/water=1/1, and dried to obtain 3.0 g of Exemplary Compound A-4.

The structure of the obtained compound was confirmed by $^1$H-NMR spectrum. IR spectrum, and mass spectrum.

$^1$H-NMR (300 MHz, CDCl$_3$), δ: 7.52-7.16 (m, 10H), 5.10 (s, 2H), 3.86 (s, 2H)

Other compounds used in Examples and Comparative Examples were synthesized according to the above-described synthesis method or a know method. The structure of each of the obtained compounds was confirmed by $^1$H-NMR spectrum. IR spectrum and mass spectrum.

2. Determination of Whether or not Polyiodide Ion I$_5^-$ Forming Ability is Exhibited in Iodide Compound-Containing Solution Whether or not each of the compounds exhibits a polyiodide ion I$_5^-$ forming ability in the iodide compound (potassium iodide) solution was determined by the above-described method (in which the standing time of the pressure-resistant test tube in the hot water bath was set to 2 hours). As a spectrophotometer, UV 3100PC, produced by Shimadzu Corporation, was used.

In each measurement, the light absorbance of the reference solution at a wavelength of 355 nm was 0.0, and thus the light absorbance of the target compound solution at a wavelength of 355 nm was used for determination.

The results are shown in Table 2 below.

TABLE 2

|  | Light absorbance at wavelength of 355 nm | Polyiodide ion I$_5^-$ forming ability |
|---|---|---|
| Compound 1-1 | 2.1 | Exhibited |
| Compound 1-2 | 2.2 | Exhibited |
| Compound 1-3 | 1.8 | Exhibited |
| Compound 1-4 | 0.1 | Exhibited |
| Compound 1-5 | 1.3 | Exhibited |
| Compound 1-6 | 0.5 | Exhibited |
| Compound 1-7 | 5.0 or higher* | Exhibited |
| Compound 1-8 | 3.0 | Exhibited |
| Compound 1-9 | 5.0 or higher* | Exhibited |
| Compound 1-10 | 5.0 or higher* | Exhibited |
| Compound 1-11 | 1.8 | Exhibited |
| Compound 1-12 | 0.3 | Exhibited |
| Comparative Compound 2-1 | 0.0 | Not exhibited |
| Comparative Compound 2-2 | 0.0 | Not exhibited |

(*Since the measurement limit (upper limit) of the light absorbance measured in the above was 5.0, the measured value equal to or higher than the measurement limit was shown as 5.0 or higher.)

3. Examples and Comparative Examples of Polarizing Plate

Examples 1 to 6 and Comparative Examples 1 and 2

<Fabrication of Polarizer (Polarizer Layer)>

A polyvinyl alcohol film (VF-PS7500, produced by Kuraray Co, Ltd., thickness: 75 μm) was used as the raw film. The polyvinyl alcohol film was subjected to each of the following steps in the sequence given below.

(Swelling Step)

Pure water was used as a treatment liquid of a swelling bath. The polyvinyl alcohol film was conveyed to a swelling bath and caused to swell by stretching the film by 2.2 times while immersing the film for 1 minute in pure water adjusted to 30° C. to induce swelling.

(Dyeing Step)

A 30° C. iodine-dyeing solution containing 0.045% by mass of iodine and 0.315% by mass of potassium iodide was used as a treatment liquid of a dyeing bath. The polyvinyl alcohol film, which had been subjected to the above swelling treatment, was conveyed to the dyeing bath and dyed by being stretched to a stretching ratio of 3.3 times of its original length while being immersed for 30 seconds in the iodine dyeing bath adjusted to 30° C.

(Crosslinking Step)

A mixed aqueous solution (1) containing 3% by mass of boric acid and 3% by mass of potassium iodide was used as a treatment liquid of a crosslinking bath. The polyvinyl alcohol film that had been treated above was conveyed to the crosslinking bath and stretched to a stretching ratio of 3.6 times of its original length while being immersed in mixed aqueous solution (1) adjusted to 30° C. for 30 seconds.

(Stretching Step)

A mixed aqueous solution (2) containing 4% by mass of boric acid and 5% by mass of potassium iodide was used as a treatment liquid of a stretching. The polyvinyl alcohol film that had been treated above was conveyed to the stretching bath, and stretched to a stretching ratio of 6.0 times of its original length while being immersed in mixed aqueous solution (2) adjusted to 60° C. for 60 seconds.

(Cleaning Step)

An aqueous solution containing 3% by mass of potassium iodide was used as a treatment liquid of a cleaning bath. The polyvinyl alcohol film that had been treated above was conveyed to the cleaning bath and immersed in the aqueous solution adjusted to 30° C. for 10 seconds.

(Drying Step)

Next, the polyvinyl alcohol film treated above was drained of water, and in a state in which tension was applied, dried for 4 minutes in an oven at 60° C. to obtain a polarizer.

<Adhesion of Polarizing Plate Protective Film>

A cellulose acetate film (product name: FUJITAC TD80 UF) produced by Fujifilm Corporation was immersed in 2.3 mol/L of an aqueous sodium hydroxide solution for 3 minutes at 55° C. The film was cleaned in a water rinsing tank at room temperature and neutralized with 0.05 mol/L of sulfuric acid at 30° C. The film was then cleaned again in the water rinsing tank at room temperature and dried with 100° C. hot air. The surface of the polarizing plate protective film was thus subjected to a saponification treatment.

In Examples 1 to 12, the polarizing plate protective film of the cellulose acetate film which had been saponified was caused to adhere to one surface of the polarizer layer fabricated above using a polyvinyl alcohol adhesive. At this time, two films were disposed such that the transmission axis of the polarizer was parallel to the slow axis of the polarizing plate protective film.

In Example 13, instead of using the polarizing plate protective film of the cellulose acetate film which had been saponified by the above-described manner, a polyester film (product name: COSMOSHINE, super birefringence type, thickness: 80 μm) produced by Toyobo Co., Ltd., which had been subjected to an easy adhesion treatment was used as a polarizing plate protective film, and the surface of the film which has been subjected to the easy adhesion treatment was disposed to the polarizer layer side. Using a polyvinyl alcohol adhesive, the polyester film was caused to adhere to one surface of the polarizer layer fabricated above.

<Application of Compound to Polarizer Layer>

In Examples 1 to 13 and Comparative Examples 2 and 3, each compound shown in Table 2 was dissolved in methyl ethyl ketone (MEK) to obtain 0.17 mol/L of a solution. The surface on the opposite side of the surface on which the polarizing plate protective film had adhered to the polarizer layer was coated with this solution with a bar coater so that the coating amount reached 26 cc/m$^2$ (26 ml/m$^2$), and dried at 80° C. for 90 seconds.

A part of the fabricated polarizing plate was subjected to the following orthogonal transmittance measurement, the other part thereof was immersed in the mixed solution of methanol/acetonitrile for 3.5 hours to extract the compound, and high performance liquid chromatography (HPLC) measurement was carried out. As a result of the measurement, the content of each compound was 0.1 parts by mass with respect to 100 parts by mass of polyvinyl alcohol resin.

In this manner, polarizing plates including each compound in at least the surface or the surface layer region including the surface were fabricated.

Comparative Example 1

A polarizing plate was fabricated in the same manner as in Examples 1 to 12 except that the compound was not applied to the polarizer layer.

Comparative Example 4

A polarizing plate was fabricated in the same manner as in Example 13 except that the compound was not applied to the polarizer layer.

4. Measurement of Orthogonal Transmittance and Variation Amount of Orthogonal Transmittance The surfaces of the polarizing plates fabricated in Examples 1 to 13 and Comparative Examples 2 and 3 to which each compound was applied were caused to adhere to a glass plate with a pressure sensitive adhesive (SK-2057, Soken Chemical & Engineering Co., Ltd.) to fabricate polarizing plate samples (about 5 cm×5 cm).

With respect to Comparative Examples 1 and 4, a polarizing plate sample was fabricated in the same manner as described above except that the opposite surface of the surface to which the polarizing plate protective film was caused to adhere adhered to a glass plate with a pressure sensitive adhesive.

The transmittance of the polarizing plate sample thus prepared was measured within a range of 380 nm to 780 nm using a VAP-7070 automatic polarizing film measuring device, produced by JASCO Ltd., and the average value for 10 measurements at a wavelength of 410 nm was obtained as the transmittance (orthogonal transmittance). The other measurement details were as described above.

Then, the orthogonal transmittance at a wavelength of 410 nm was measured as the average value of 10 measurements by the same method after keeping each polarizing plate sample for 500 hours in an environment of 60° C. and a relative humidity of 90% RH.

Each of the orthogonal transmittances before and after the time had passed was measured in an environment of 25° C. and a relative humidity of 60% RH.

The variation of the orthogonal transmittance before and after the time had passed was obtained and this value was evaluated as polarizing plate durability.

The results are shown in Table 3 below.

TABLE 3

| | | Orthogonal transmittance | | |
| --- | --- | --- | --- | --- |
| | Compound applied to polarizer layer | (1) Before time passed [%] | (2) After 500 hours passed at 60° C. and 90% RH [%] | Variation amount of orthogonal transmittance (2)-(1) [%] |
| Example 1 | Compound 1-1 | 0.02 | 0.01 | −0.01 |
| Example 2 | Compound 1-2 | 0.02 | 0.00 | −0.02 |
| Example 3 | Compound 1-3 | 0.02 | 0.01 | −0.01 |
| Example 4 | Compound 1-4 | 0.02 | 0.02 | 0.00 |
| Example 5 | Compound 1-5 | 0.02 | 0.01 | −0.01 |
| Example 6 | Compound 1-6 | 0.02 | 0.02 | 0.00 |
| Example 7 | Compound 1-7 | 0.02 | 0.00 | −0.02 |
| Example 8 | Compound 1-8 | 0.02 | 0.01 | −0.01 |
| Example 9 | Compound 1-9 | 0.02 | 0.00 | −0.02 |
| Example 10 | Compound 1-10 | 0.02 | 0.00 | −0.02 |
| Example 11 | Compound 1-11 | 0.02 | 0.02 | 0.00 |
| Example 12 | Compound 1-12 | 0.02 | 0.01 | −0.01 |
| Example 13 | Compound 1-1 | 0.02 | 0.02 | 0.00 |
| Comparative Example 1 | None | 0.02 | 0.07 | 0.05 |
| Comparative Example 2 | Comparative Compound 2-1 | 0.02 | 0.07 | 0.05 |
| Comparative Example 3 | Comparative Compound 2-2 | 0.02 | 0.07 | 0.05 |
| Comparative Example 4 | None | 0.02 | 0.07 | 0.05 |

From the results shown in Table 3, in the polarizing plates of Examples 1 to 13 including the compound exhibiting a polyiodide ion $I_5^-$ forming ability in the iodide compound solution as shown in Table 2, it could be confirmed that the variation of the orthogonal transmittance at a wavelength of 410 nm in a high temperature and high humidity environment was suppressed. In the polarizing plates of Examples 1 to 13, at wavelengths measured other than 410 nm, good durability was obtained.

A liquid crystal display device combined with the polarizing plate having a low orthogonal transmittance at a wavelength of 410 nm has little light leakage in the vicinity of a wavelength of 410 nm and the bluish tint in the black display state of the display is prevented from being exhibited. Accordingly, excellent color reproducibility can be exhibited. That is, it is possible to provide a liquid crystal display device having excellent color reproducibility in a high temperature and high humidity environment after the time has passed by being combined with the polarizing plate in which the variation of the orthogonal transmittance at a wavelength of 410 nm in a high temperature and high humidity environment is suppressed as described above.

EXPLANATION OF REFERENCES

1: Upper polarizing plate
2: Direction of absorption axis of upper polarizing plate
3: Liquid crystal cell upper electrode substrate
4: Alignment control direction of upper substrate
5: Liquid crystal layer
6: Liquid crystal cell lower electrode substrate
7 Alignment control direction of lower substrate
8: Lower polarizing plate
9: Direction of absorption axis of lower polarizing plate
10: Liquid crystal display device

What is claimed is:
1. A polarizing plate comprising:
at least a polarizer layer including a polyvinyl alcohol film dyed with iodine; and
a compound exhibiting a polyiodide ion $I_5^-$ forming ability in an iodide compound-containing solution,
wherein the compound is included in the polarizer layer.

2. The polarizing plate according to claim 1,
wherein the compound is present at least on a surface of the polarizer layer or in a surface layer region including the surface of the polarizer layer.

3. The polarizing plate according to claim 1,
wherein the compound includes carbon atoms which are bonded to an electron-withdrawing group through a single bond and not bonded to any other carbon atoms through a double bond.

4. The polarizing plate according to claim 3,
wherein the compound is an unsaturated fatty acid.

5. The polarizing plate according to claim 3,
wherein the electron-withdrawing group is a carbonyl group.

6. The polarizing plate according to claim 5,
wherein the compound is an unsaturated fatty acid.

7. The polarizing plate according to claim 3,
wherein the compound includes one or more hetero atoms.

8. The polarizing plate according to claim 3,
wherein the compound has a cyclic structure including the carbon atoms.

9. The polarizing plate according to claim 8,
wherein the cyclic structure is a heterocyclic ring.

10. The polarizing plate according to claim 9,
wherein the cyclic structure is a nitrogen-containing heterocyclic ring.

11. The polarizing plate according to claim 8,
wherein the cyclic structure is a 5-membered or 6-membered ring.

12. The polarizing plate according to claim 1,
wherein the compound includes carbon atoms which are bonded to each of two electron-withdrawing groups through a single bond and not bonded to any other carbon atoms through a double bond.

13. The polarizing plate according to claim 12,
wherein the electron-withdrawing group is a carbonyl group.

14. The polarizing plate according to claim 12,
wherein the compound includes one or more hetero atoms.

15. The polarizing plate according to claim 12,
wherein the compound has a cyclic structure including the carbon atoms.

16. The polarizing plate according to claim 15,
wherein the cyclic structure is a heterocyclic ring.

17. The polarizing plate according to claim 15,
wherein the cyclic structure is a 5-membered or 6-membered ring.

18. A method for producing the polarizing plate according to claim 1 comprising:
a step of forming at least one layer including the compound exhibiting the polyiodide ion $I_5^-$ forming ability in the iodide compound-containing solution.

19. The method for producing the polarizing plate according to claim 18, further comprising:
at least a dyeing step of dyeing the polyvinyl alcohol film with iodine; and
a step of forming the polarizer layer including the compound exhibiting the polyiodide ion $I_5^-$ forming ability in the iodide compound-containing solution by applying the compound to the polyvinyl alcohol film at least before the dyeing step, during the dyeing step, or after the dyeing step.

20. The method for producing the polarizing plate according to claim 19,
wherein the application of the compound is carried out by coating at least one surface of the polyvinyl alcohol film dyed with iodine with a solution including the compound.

21. A liquid crystal display device comprising the polarizing plate according to claim 1.

* * * * *